United States Patent
Yang et al.

(10) Patent No.: US 12,052,192 B2
(45) Date of Patent: Jul. 30, 2024

(54) DISTRIBUTED TRANSMISSION OF SHORT TRAINING FIELDS

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Qifan Chen, Newark, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/402,475

(22) Filed: Aug. 13, 2021

(65) Prior Publication Data

US 2023/0069075 A1    Mar. 2, 2023

(51) Int. Cl.
*H04L 5/00* (2006.01)
*H04L 27/26* (2006.01)
*H04W 52/18* (2009.01)

(52) U.S. Cl.
CPC ........... *H04L 5/0048* (2013.01); *H04W 52/18* (2013.01)

(58) Field of Classification Search
CPC .............................. H04L 5/0048; H04W 52/18
See application file for complete search history.

(56) References Cited

U.S. PATENT DOCUMENTS

| | | | |
|---|---|---|---|
| 8,619,655 B2 | 12/2013 | Zheng et al. | |
| 2011/0305178 A1* | 12/2011 | Zheng | H04W 52/16 370/311 |
| 2013/0142276 A1* | 6/2013 | Baik | H04B 7/0671 375/295 |
| 2015/0063255 A1* | 3/2015 | Tandra | H04W 72/0453 370/329 |
| 2016/0165482 A1* | 6/2016 | Yang | H04L 27/26132 370/336 |
| 2016/0255645 A1* | 9/2016 | Li | H04W 56/001 370/329 |
| 2017/0134900 A1* | 5/2017 | Malik | H04L 1/0086 |
| 2017/0201975 A1* | 7/2017 | Yang | H04L 69/324 |
| 2022/0094394 A1* | 3/2022 | Park | H04W 72/12 |
| 2022/0294558 A1 | 9/2022 | Park et al. | |

FOREIGN PATENT DOCUMENTS

WO    2021029553 A1    2/2021

OTHER PUBLICATIONS

International Search Report and Written Opinion—PCT/US2022/074080—ISA/EPO—dated Nov. 14, 2022.

* cited by examiner

*Primary Examiner* — Xuan Lu
(74) *Attorney, Agent, or Firm* — Kevin M. Donnelly; Polsinelli LLP

(57) ABSTRACT

This disclosure provides methods, devices and systems for distributed transmission of short training fields in a power spectral density limited frequency band. In one aspect, a device receives a distributed resource unit (dRU) assignment for transmission of a dRU portion of a physical layer protocol data unit (PPDU); determines a spatial stream global cyclic shift delay (CSD) index for an short training field (STF) of the dRU portion of the PPDU; and transmits, based on the spatial stream global CSD index, the EHT of the dRU portion of the PPDU across a dRU spreading bandwidth associated with the dRU assignment using a tone plan and sequence corresponding to a regular resource unit (rRU) transmission mode.

30 Claims, 15 Drawing Sheets

DISTRIBUTED TRANSMISSION OF SHORT TRAINING FIELDS

TECHNICAL FIELD

This disclosure relates generally to wireless communication. For example, aspects of the disclosure relate to distributed transmission of short training fields for use in communicating on wireless channels.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a BSS Identifier (BSSID) that is advertised by the AP. An AP periodically broadcasts beacon frames to enable any STAs within wireless range of the AP to establish or maintain a communication link with the WLAN.

Some wireless communications systems (for example, Wi-Fi or WLAN systems) may support allocating multiple resource units (RUs) over a channel bandwidth. These RUs may be used by devices (for example, one or more APs or one or more STAs) for communication of data and pilot signals. However, the configurations of some RUs (for example, the locations of the allocated data and pilot tones for each RU) may not efficiently utilize the available transmit power for a device (for example, a device may reduce power when communicating via one or more RUs) and improved techniques are desired.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes: receiving a distributed resource unit (dRU) assignment for transmission of a dRU portion of a physical layer protocol data unit (PPDU); determining a spatial stream global cyclic shift delay (CSD) index for a short training field (STF) of the dRU portion of the PPDU; and transmitting, based on the spatial stream global CSD index, the STF of the dRU portion of the PPDU across a dRU spreading bandwidth associated with the dRU assignment using a tone plan and sequence corresponding to a regular resource unit (rRU) transmission mode.

Another innovative aspect of the subject matter described in this disclosure can be implemented in a wireless communication device. The wireless communication device includes at least one modem (for example, implemented in circuitry), at least one processor (for example, implemented in circuitry) communicatively coupled with the at least one modem, at least one memory communicatively coupled with the at least one processor. The at least one memory stores processor-readable code that, when executed by the at least one processor in conjunction with the at least one modem, is configured to: receive a dRU assignment for transmission of a dRU portion of a PPDU; determine a spatial stream global CSD index for an STF of the dRU portion of the PPDU; and transmitting, based on the spatial stream global CSD index, the STF of the dRU portion across a dRU spreading bandwidth associated with the dRU assignment using a tone plan and sequence corresponding to a rRU transmission mode.

In some aspects, the PPDU includes a long training field (LTF) and a data field. In such aspects, one or more of the methods, apparatuses, and computer-readable medium described above further comprise: setting a transmission power for the STF based on a transmission power associated with the LTF and the data field of the PPDU.

In some aspects, one or more of the methods, apparatuses, and computer-readable medium described above further comprise: setting the transmission power for the STF to be the same as the LTF dRU transmission power or data power for distributed transmission on the dRU spreading bandwidth.

In some aspects, one or more of the methods, apparatuses, and computer-readable medium described above further comprise: obtaining a dRU assignment index allocated to the wireless communication device based on the dRU assignment; and determining, based on the dRU assignment index and the spatial stream global CSD index, a CSD start index for the wireless communication device. In such aspects, the EHT-STF is transmitted across the dRU spreading bandwidth based on the CSD start index.

In some aspects, one or more of the methods, apparatuses, and computer-readable medium described above further comprise: determining, based on an association identifier (AID) associated with the wireless communication device and the spatial stream global CSD index, a CSD start index for the wireless communication device. In such aspects, the EHT-STF is transmitted across the dRU spreading bandwidth based on the CSD start index.

In some aspects, one or more of the methods, apparatuses, and computer-readable medium described above further comprise: determining, based on a first tone index of the dRU assignment and the spatial stream global CSD index, a CSD start index for the wireless communication device. In such aspects, the EHT-STF is transmitted across the dRU spreading bandwidth based on the CSD start index.

In some aspects, one or more of the methods, apparatuses, and computer-readable medium described above further comprise: determining, based on a start tone offset associated with a dRU tone table corresponding to the dRU assignment and the spatial stream global CSD index, a CSD start index for the wireless communication device. In such aspects, the EHT-STF is transmitted across the dRU spreading bandwidth based on the CSD start index.

In some aspects, one or more of the methods, apparatuses, and computer-readable medium described above further comprise: determining a CSD start index for the wireless communication device as a random number between 1 and a maximum number of supported spatial streams associated with a CSD table corresponding to the spatial stream global CSD index. In such aspects, the EHT-STF is transmitted across the dRU spreading bandwidth based on the CSD start index.

In some aspects, transmitting the STF across the dRU spreading bandwidth using the tone plan and sequence corresponding to the rRU mode includes transmitting the STF every 8 tones of the dRU spreading bandwidth.

Another innovative aspect of the subject matter described in this disclosure can be implemented in a method for wireless communication. The method includes: receiving a dRU assignment for transmission of a dRU portion of a PPDU; and determining a tone shift amount for STF of the dRU portion of the PPDU.

Another innovative aspect of the subject matter described in this disclosure can be implemented in a wireless communication device. The wireless communication device includes at least one modem (for example, implemented in circuitry), at least one processor (for example, implemented in circuitry) communicatively coupled with the at least one modem, at least one memory communicatively coupled with the at least one processor. The at least one memory stores processor-readable code that, when executed by the at least one processor in conjunction with the at least one modem, is configured to: receive a dRU assignment for transmission of a dRU portion of a PPDU; determine a tone shift amount for STF of the dRU portion of the PPDU; and transmit the STF of the dRU portion of the PPDU across a dRU spreading bandwidth associated with the dRU assignment using a tone plan and sequence corresponding to a rRU mode shifted by the tone shift amount.

In some aspects, one or more of the methods, apparatuses, and computer-readable medium described above further comprise: obtaining a dRU assignment index allocated to the wireless communication device based on the dRU assignment in a user information field, wherein the dRU assignment identifies the dRU assignment including a quantity of tones and a bandwidth configuration of the dRU assignment; and determining the tone shift amount based on the dRU assignment index.

In some aspects, one or more of the methods, apparatuses, and computer-readable medium described above further comprise: obtaining an AID allocated to the wireless communication device; and determining the tone shift amount based on the AID.

In some aspects, one or more of the methods, apparatuses, and computer-readable medium described above further comprise: obtaining a first tone index of the dRU assignment; and determining the tone shift amount based on the first tone index.

In some aspects, one or more of the methods, apparatuses, and computer-readable medium described above further comprise: obtaining a start tone offset associated with a dRU tone table corresponding to the dRU assignment; and determining the tone shift amount based on the start tone offset.

Another innovative aspect of the subject matter described in this disclosure can be implemented in a method for wireless communication. The method includes: receiving a dRU assignment for transmission of a dRU portion of a PPDU; determining a STF sequence assigned to the wireless communication device for an STF of the dRU portion of the PPDU; and transmitting, based on the STF sequence, the STF of the dRU portion of the PPDU across a dRU spreading bandwidth associated with the dRU assignment using a tone plan and sequence corresponding to a rRU transmission mode.

Another innovative aspect of the subject matter described in this disclosure can be implemented in a wireless communication device. The wireless communication device includes at least one modem (for example, implemented in circuitry), at least one processor (for example, implemented in circuitry) communicatively coupled with the at least one modem, at least one memory communicatively coupled with the at least one processor. The at least one memory stores processor-readable code that, when executed by the at least one processor in conjunction with the at least one modem, is configured to: receive a dRU assignment for transmission of a dRU portion of a PPDU; determine a STF sequence assigned to the wireless communication device for an STF of the dRU portion of the PPDU; and transmitting, based on the STF sequence, the STF of the dRU portion of the PPDU across a dRU spreading bandwidth associated with the dRU assignment using a tone plan and sequence corresponding to a rRU transmission mode.

In some aspects, determining the STF sequence assigned to the wireless communication device includes applying an orthogonal sequence to the STF of the dRU portion of the PPDU based on the dRU assignment.

Another innovative aspect of the subject matter described in this disclosure can be implemented in a method for wireless communication. The method includes: receiving a dRU assignment for transmission of a PPDU; and transmitting an STF of the PPDU across a dRU spreading bandwidth using a tone plan and sequence of an LTF.

Another innovative aspect of the subject matter described in this disclosure can be implemented in a wireless communication device. The wireless communication device includes at least one modem (for example, implemented in circuitry), at least one processor (for example, implemented in circuitry) communicatively coupled with the at least one modem, at least one memory communicatively coupled with the at least one processor. The at least one memory stores processor-readable code that, when executed by the at least one processor in conjunction with the at least one modem, is configured to: receive a dRU assignment for transmission of a PPDU; and transmit an STF of the PPDU across a dRU spreading bandwidth using a tone plan and sequence of an LTF.

In some aspects, transmitting the STF of the PPDU across the dRU spreading bandwidth includes transmitting the STF directly on a plurality of tones of the dRU spreading bandwidth.

In some aspects, one or more of the methods, apparatuses, and computer-readable medium described above further comprise: rounding a plurality of tones of the dRU spreading bandwidth to a multiple; and transmitting the STF on the rounded plurality of tones of the dRU.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims:

Like reference numbers and designations in the various drawings indicate like elements.

DETAILED DESCRIPTION

Figure 1:
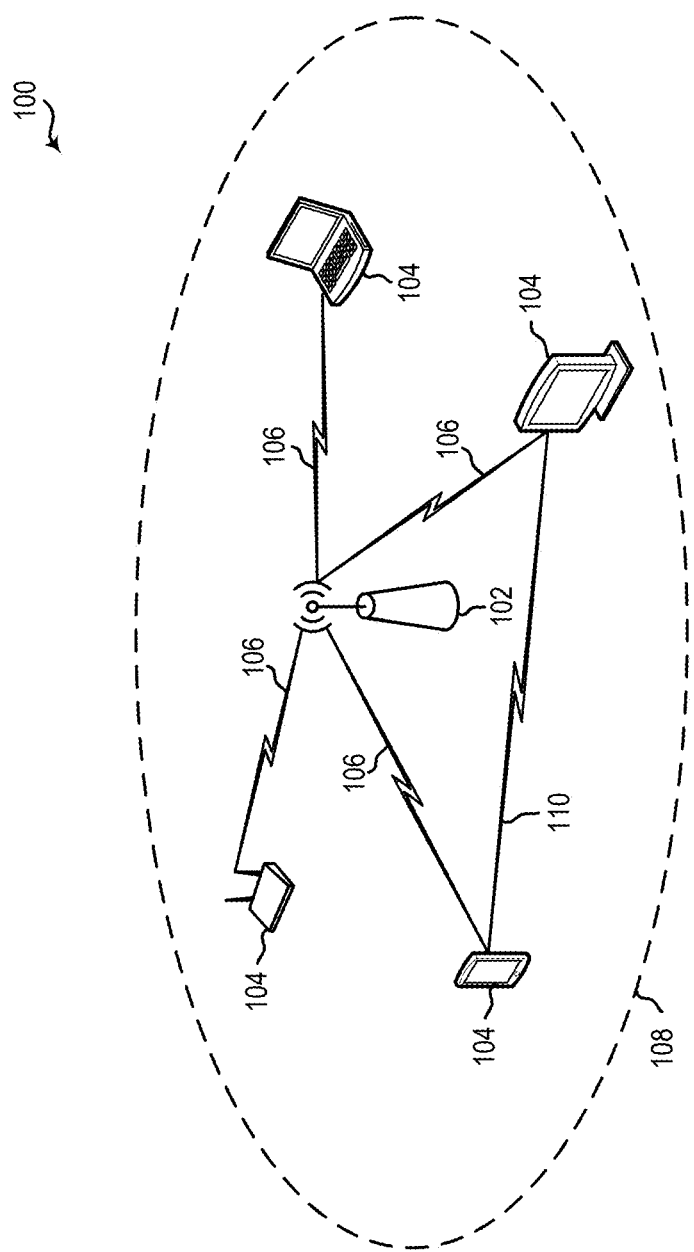
FIG. 1 shows a block diagram of an example wireless communication network, in accordance with some examples.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Some wireless communications systems (for example, Wi-Fi or WLAN systems) may support allocating multiple resource units (RUs) over a channel bandwidth. For example, an access point (AP) may allocate each of multiple RUs to one or more respective stations (STAs). For example, the AP may transmit a downlink (DL) OFDMA communication that includes multiple RUs each addressed to a respective STA. Similarly, the AP may transmit scheduling information to multiple STAs that indicates an RU allocation. The RU allocation may indicate which RU each of the STAs is to use to transmit an uplink (UL) OFDMA communication to the AP. Each of the RUs includes a fixed number of tones or subcarriers. Some of the tones (a majority of the tones in some cases) are used to carry data symbols, and some of the tones ("pilot tones") are used to carry pilot symbols. Pilot signals may be transmitted with the data to improve reception and reliability of the data.

The configurations of some RUs (for example, the locations of the allocated data and pilot tones in each RU) may not efficiently utilize the available transmit power of the transmitting device. For example, a device may reduce power when communicating via one or more RUs, such as based on a power spectral density (PSD) limit for a communication bandwidth including the one or more RUs. In some aspects, a channel bandwidth may have a transmit power constraint (such as a regulatory constraint or a capability constraint) for communications in terms of PSD (for example, in a PSD-limited domain). For example, for low power indoor (LPI) scenarios in the 6 gigahertz (GHz) spectrum, an uplink communication may be limited to a PSD limit of −1 decibel-milliwatts (dBm) of each megahertz (MHz) and a downlink communication may be limited to a PSD limit of 5 dBm of each megahertz. Communications over some RUs may therefore need to be reduced in transmit power to remain within a specified PSD limit. Additionally or alternatively, a channel bandwidth may be subject to constraints in available frequency ranges.

A distributed RU (dRU) has been proposed over wider bandwidth to allow higher total transmission power and a higher per tone transmission power as compared to regular RU (rRU). In a dRU transmission mode, different logic RUs are mapped to physical RUs across a distribution or spreading bandwidth. The distinct physical RUs can be assigned to respective communication device to prevent tone collisions. A dRU transmission mode operation may include interleaving tones across the spreading bandwidth to allow multiple devices to transmit with higher transmission power while maintaining spectral efficiency gains provided by UL OFDMA multiplexing. An Extremely High Throughput (EHT)-short training field (EHT-STF) is transmitted to control an automatic gain control (AGC) setting, direct current (DC) estimation, and DC offset for receiving an EHT-long training field (EHT-LTF) and EHT modulated data. In an rRU transmission mode in some cases (e.g., in an UL TB physical layer protocol data unit (PPDU) with rRU mode), the EHT-STF is transmitted every 8 tones, which may limit transmission power of the EHT-STF in dRU transmission mode and affect the AGC setting, DC estimation, and DC offset for receiving the EHT-LTF and the EHT modulated data. As used herein, the term PPDU can refer to a physical layer protocol data unit or to a physical layer convergence protocol (PLCP) PDU.

Various aspects described herein relate to transmission of a non-legacy STF in a dRU transmission mode. In the following description, the term "non-legacy" refers to versions and amendments of the IEEE 802.11 family of standards beginning with 802.11be, while "legacy" refers to versions and amendments of the IEEE 802.11 family of standards prior to 802.11be. Some specific examples relate to transmitting an EHT-STF that is spread across a dRU spreading bandwidth, as opposed to being transmitted in a contiguous group of tones within a wireless channel. In some specific examples, the EHT-STF is transmitted across the dRU spreading bandwidth with a transmission power that is determined based on an EHT-LTF and/or EHT-modulated data that follows the EHT-STF in a data unit (for example, a PPDU). In some examples, the non-legacy STF is transmitted with a global cyclic shift delay (CSD) to prevent collisions with other wireless communications devices. In some examples, the tones for the non-legacy STF transmitted by different respective STAs are interleaved throughout the spreading bandwidth so as to avoid collisions with each other. Additionally or alternatively, in some examples, respective orthogonal sequences are applied to the non-legacy STF tones transmitted by the multiple STAs so as to avoid collisions with each other. In some examples, a dRU assignment may be used to determine a global CSD index, a tone shift offset, or an orthogonal sequence.

Some aspects further relate to transmission of a non-legacy STF using a tone plan and sequence associated with a non-legacy LTF. In some examples, a dRU assignment can be used to identify the tones within the spreading bandwidth used for transmission of the non-legacy LTF, and the non-legacy STF can be transmitted on the same non-legacy LTF tones across the spreading bandwidth. In some such examples, the non-legacy STF tones can be rounded (using various factors) from the dRU tones to maintain a desired or appropriate periodicity.

Particular implementations of the subject matter described in this disclosure can be implemented to realize one or more of the following potential advantages. In some implementations, the described techniques can be used to transmit the non-legacy STF spread across the dRU bandwidth and with a transmission power determined based on the non-legacy LTF and the non-legacy-modulated data. In some aspects, the transmission power of the non-legacy STF can be increased to allow the receiver device to correctly determine the AGC setting, DC estimation, and DC offset for receiving the non-legacy LTF and the non-legacy-modulated data. Some such aspects can apply different techniques to prevent non-legacy STF transmissions (e.g., EHT-STF transmissions) from interfering with non-legacy STF transmissions (e.g., EHT-STF transmissions) from different respective STAs for example, by implementing a CSD.

Additionally or alternatively, in some other examples, the non-legacy (e.g., EHT) STF tones of the non-legacy (e.g., EHT) STF transmitted by different respective STAs are interleaved throughout the spreading bandwidth so as to avoid collisions with each other. Additionally or alternatively, respective orthogonal sequences, such as a Hadamard code, are applied to the non-legacy STF tones transmitted by the multiple STAs so as to avoid collisions with each other. As such, the transmission power of the non-legacy (e.g., EHT) STF can be maintained to correctly determine an AGC setting, DC estimation, and DC offset for receiving the non-legacy (e.g., EHT) LTF and the non-legacy (e.g., EHT) modulated data. In other aspects, the non-legacy (e.g., EHT) STF tones can be transmitted using a tone plan and sequence of an non-legacy (e.g., EHT) LTF. As such, the transmission power of the non-legacy STF can match the transmission power of the non-legacy LTF to correctly determine an AGC setting, DC estimation, and DC offset for receiving the non-legacy LTF and the non-legacy modulated data.

Aspects of the disclosure are initially described in the context of wireless communications systems. Additional aspects are described with respect to a channel bandwidth configuration, system bandwidth configurations, tone mapping configurations, and a timing diagram. Aspects of the disclosure are further illustrated by and described with reference to apparatus diagrams, system diagrams, and flowcharts that relate to a configuration for distributed RUs.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an AP 102 and multiple STAs 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. After association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such aspects, while the STAs 104 may be capable of communicating with each other through the AP 102 using communication links 108, STAs 104 also can communicate directly with each other via direct wireless links 110. Two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the physical (PHY) and MAC layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
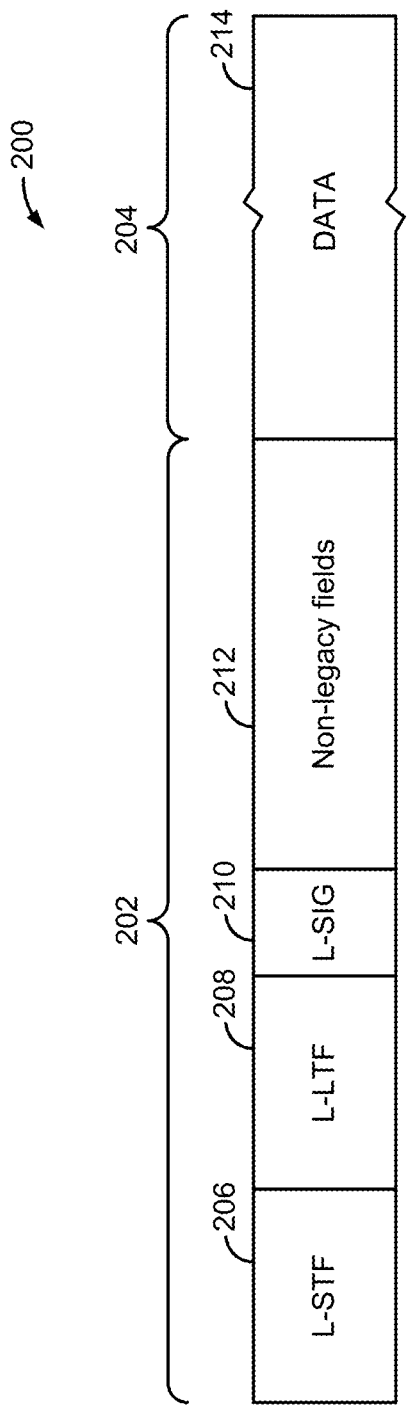
FIG. 2A shows an example protocol data unit (PDU) usable for communications between an access point (AP) and one or more stations (STAs), in accordance with some examples.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two binary phase shift keying (BPSK) symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and AGC. The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a BPSK modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 2B:
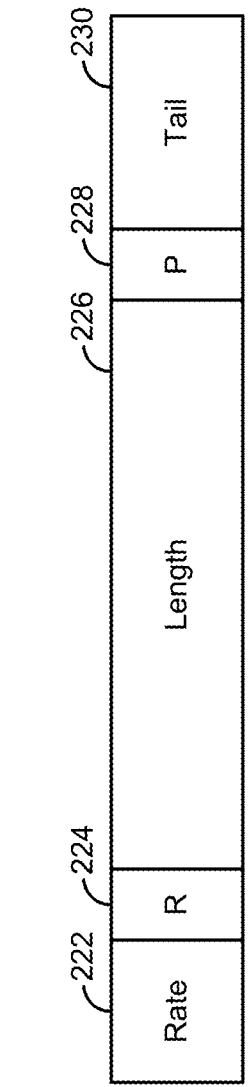
FIG. 2B shows an example field in the PDU of FIG. 2A, in accordance with some examples.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
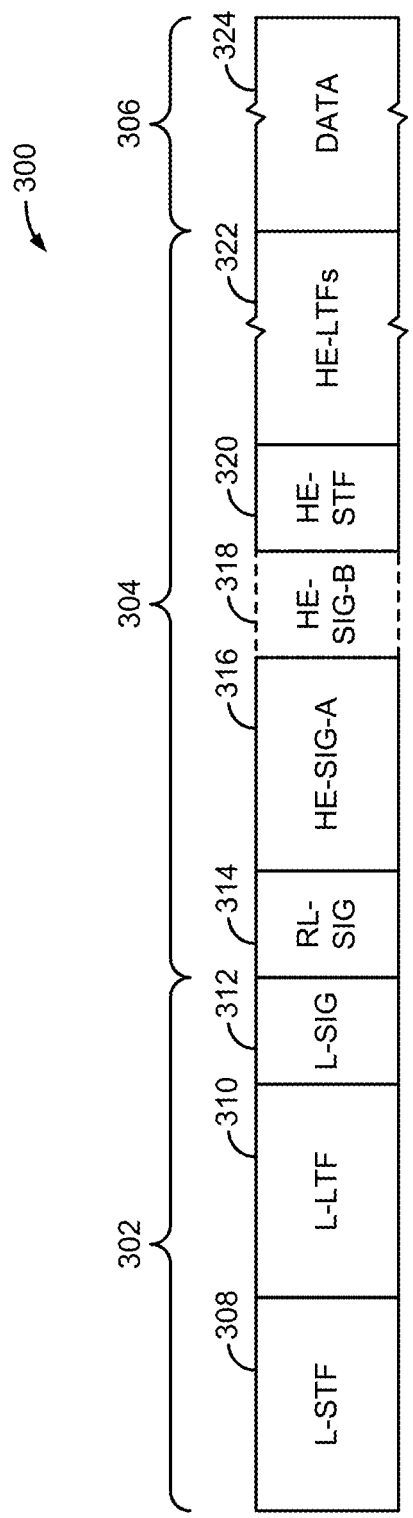
FIG. 3A shows an example physical (PHY) layer convergence protocol (PLCP) protocol data unit (PPDU) usable for communications between an AP and one or more STAs, in accordance with some examples.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding RUs in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
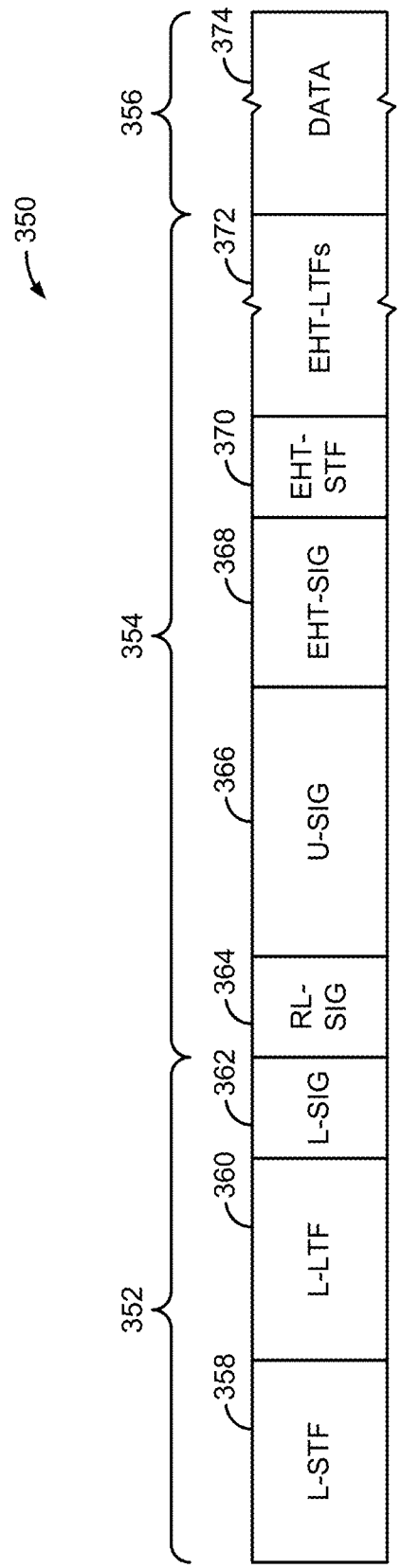
FIG. 3B shows another example PPDU usable for communications between an AP and one or more STAs, in accordance with some examples.

FIG. 3B shows another example PPDU 350 usable for wireless communication between an AP and one or more STAs. The PPDU 350 may be used for SU, OFDMA or MU-MIMO transmissions. The PPDU 350 may be formatted as an EHT WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it waits for a particular time and then contend for access to the wireless medium. In some aspects, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that elapses before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device senses the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. If there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). The different durations and access categories enable particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 4:
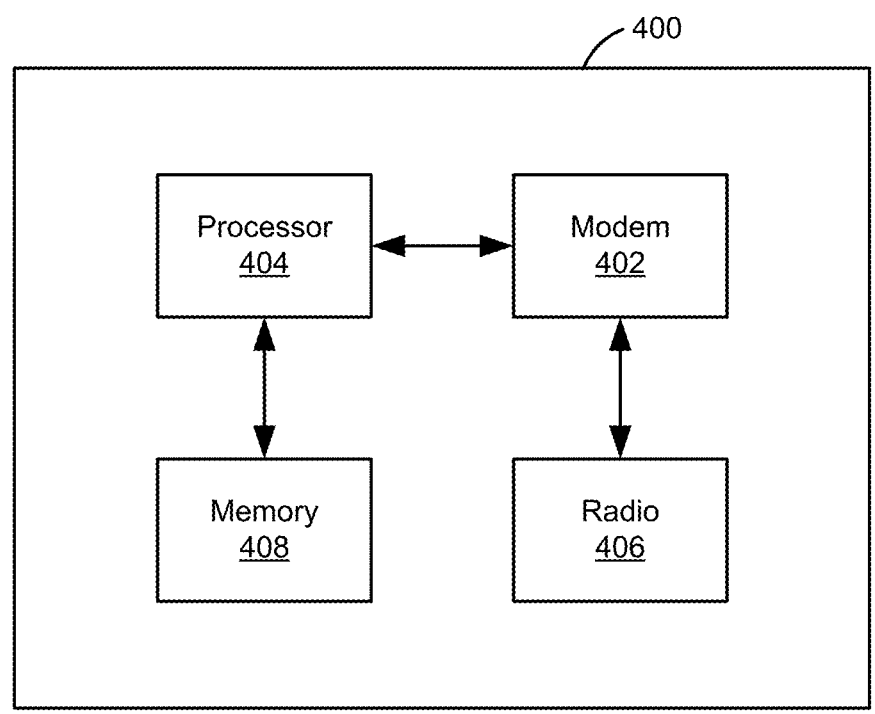
FIG. 4 shows a block diagram of an example wireless communication device, in accordance with some examples.

FIG. 4 shows a block diagram of an example wireless communication device 400. In some aspects, the wireless communication device 400 can be an example of a device for use in a STA such as one of the STAs 104 described above with reference to FIG. 1. In some aspects, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of PPDUs and MAC protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some aspects, the one or more modems 402 (collectively "the modem 402") additionally include a WWAN modem (for example, a 3GPP 4G LTE or 5G compliant modem). In some aspects, the wireless communication device 400 also includes one or more processors, processing blocks or processors 404 (collectively "the processor 404") coupled with the modem 402. In some aspects, the wireless communication device 400 additionally includes one or more radios 406 (collectively "the radio 406") coupled with the modem 402. In some aspects, the wireless communication device 400 further includes one or more memory blocks or elements (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, AGC circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some aspects, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a digital signal processor (DSP), an ASIC, a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some aspects, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some aspects, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
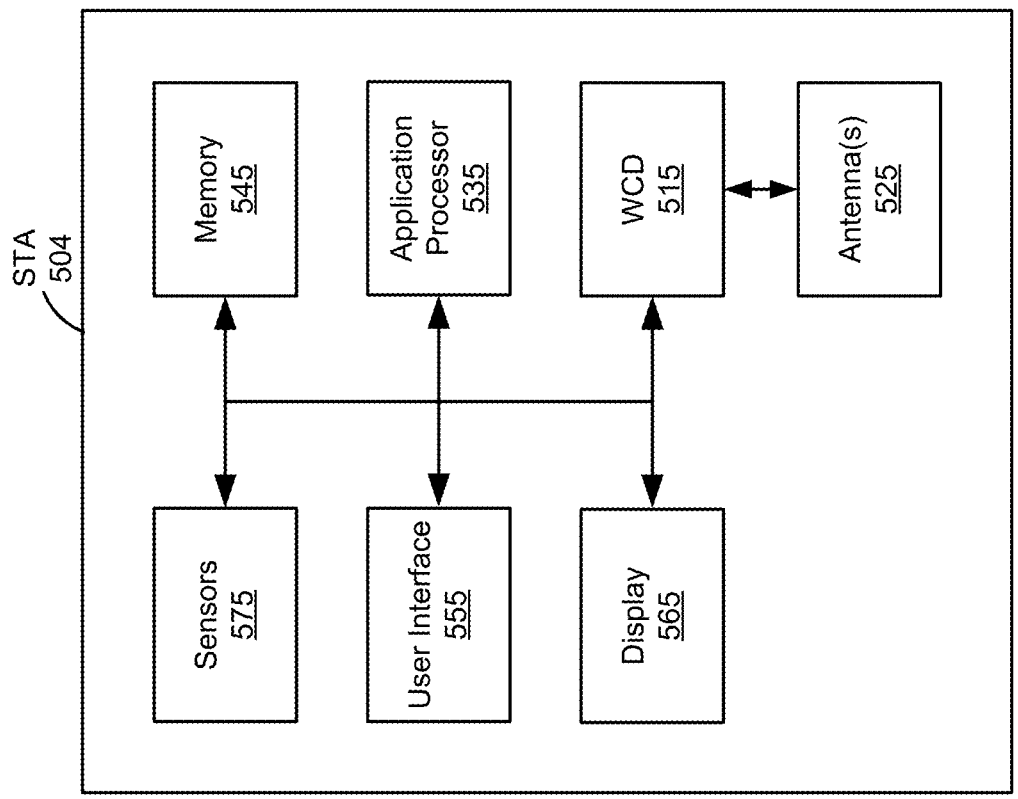
FIG. 5B shows a block diagram of an example STA, in accordance with some examples.
Figure 5A:
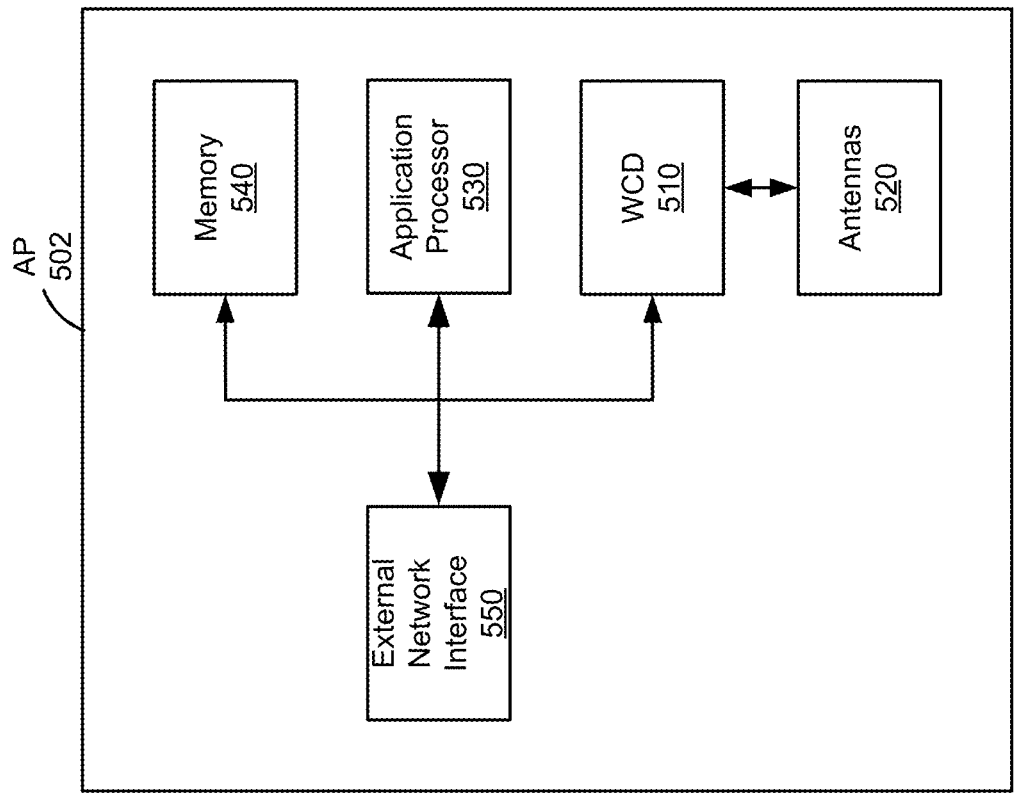
FIG. 5A shows a block diagram of an example AP, in accordance with some examples.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some aspects, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some aspects, the STA 504 further includes a user interface (UI) 555 (such as a touchscreen or keypad) and a display 565, which may be integrated with the UI 555 to form a touchscreen display. In some aspects, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, a frequency band, such as the 6.4 GHz, 5 GHz, or 6 GHz frequency bands, may have channels defined within the frequency band. These values describe a range of frequencies around the given frequency value which are part of the band identified by a specific frequency number. Each frequency band may have a uniform subchannel bandwidth, such as 20 MHz that is used to cover a total bandwidth associated with a given frequency band. As described above, some WLAN devices are capable of transmitting at higher bandwidths by concurrently using multiple subchannels (referred to as "channel bonding"), allowing the devices to use the subchannels efficiently with shared signaling overhead. By increasing the number of subchannels bonded into a channel, larger bandwidth channels (referred to as wide bandwidth channels) can be created. Such wide bandwidth channels can increase efficiency by limiting the signaling used and increasing the signaling efficiency of the frequency band. As channel bandwidth increases, the complexity of channel access and contention with other devices to use the channel can increase. Larger channel bandwidths can lead to complexities both with limits on transmission power and fairness in sharing access to frequency band resources between different devices, in addition to the basic issues with implementing structures to enable wide bandwidth channels.

Legacy systems include support for smaller bandwidth channels in different clear channel assessment (CCA) modes. Full CCA in such modes includes energy detection and preamble detection CCA checks across a given combination of channel bandwidths to determine if the channel is busy or idle, along with a random backoff when the CCA results in an idle indication. These legacy CCA modes can include non-puncturing transmission modes with poor spectral efficiency and less flexibility in an operating bandwidth selection. The legacy CCA modes can also include a per 20 MHz puncturing transmission mode. The per 20 MHz puncturing transmission mode allows increased spectral efficiency, but uses hardware resources and has additional overhead in the form of a more complex preamble in transmissions. A third mode includes a trigger-based (TB) PPDU mode. The third mode can include a per 20 MHz bitmap with short interframe space (SIFS) CCA checks. The third mode can include enhanced distributed channel access on each 20 MHz subchannel and uses only an energy detection threshold without a preamble detection CCA threshold, though the third mode does not qualify as an independent full CCA check for normal channel contention and access.

Various aspects described herein address the above issues as related generally to CCA modes and operations to enable wireless communications using wide bandwidth channels at or above 240 MHz bandwidths.

Figure 6:
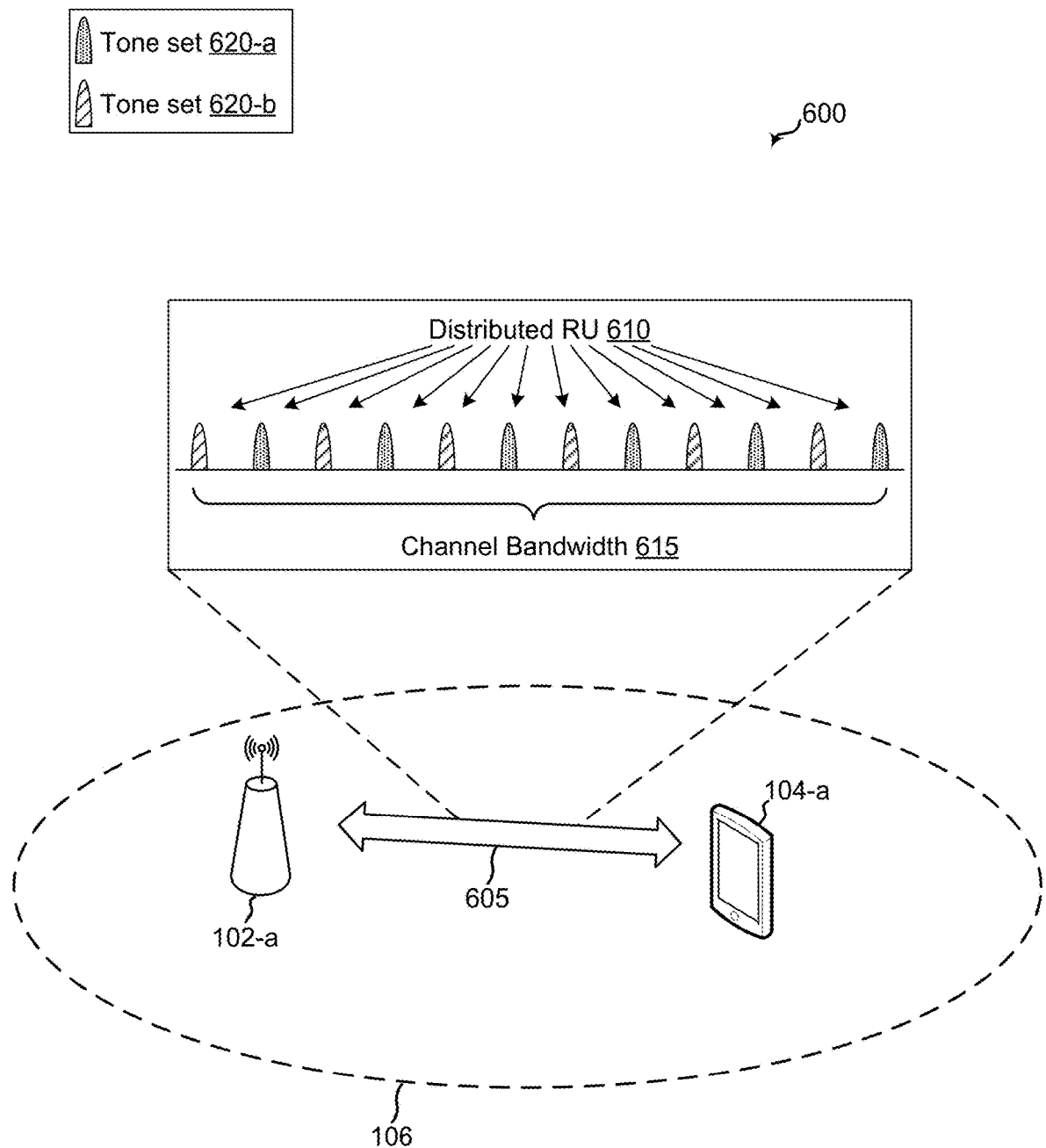
FIG. 6 shows a pictorial diagram of an example wireless communication network transmitting across a spreading bandwidth, in accordance with some examples.

FIG. 6 shows a pictorial diagram of an example wireless communication network 600 transmitting across a spreading bandwidth (also referred to herein as a distribution bandwidth). The wireless communication network 600 may be an example of a wireless communication network 100 and may include an AP 102-a and a STA 104-a, which may be examples of the corresponding devices described with reference to FIG. 1. The AP 102-a may provide network coverage for a coverage area 106. The AP 102-a and the STA 104-a may communicate over a communication link 605 (for example, transmitting data or pilot signals on the uplink or the downlink). The AP 102-a and the STA 104-a may utilize one or more dRUs 610 to improve frequency diversity gain and to obtain a power advantage for communications.

The wireless communication network 600 (for example, a Wi-Fi system or WLAN) may use logic RUs as building blocks for a dRU 610. The wireless communication network 600 may include a different number of tones (N) that are distributed across an allocated bandwidth (for example, 20 MHz, 40 MHz, and 80 MHz). In some examples, logic RU26 includes a set of 26 tones that are distributed across the bandwidth, logic RU52 includes a set of 52 tones that are distributed across the bandwidth, and logic RU106 includes a set of 106 tones that are distributed across the bandwidth. A transmitting device (for example, the AP 102-a or the STA 104-a) may spread the tones of a logic RU over a specific bandwidth to obtain a power advantage for the transmission (for example, to increase the transmit power while maintaining a PSD limitation). In this way, while the logic RU may correspond to a narrowband, the logic RU may be spread over a wider frequency domain. For example, the AP 102-a may distribute the tones for the dRU 610 across a channel bandwidth 615. In some examples, an aggregate bandwidth (for example, in terms of a quantity of tones) for the tones may be less than a quantity of tones associated with the channel bandwidth 615.

In an rRU transmission mode, the logic RUs are grouped in contiguous tones because maximum transmission power can be based on a fixed power over an entire bandwidth (for example, 24 dBm or 0.25 Watts). In some aspects, the rRU tones for data tones and pilot tones are identified in contiguous ranges identified in Table 1 below.

TABLE 1

| Logic RU | RU type | RU index and subcarrier range | | | | |
|---|---|---|---|---|---|---|
| RU26 | RU 1 | RU 2 | RU 3 | RU 4 | RU 5 | |
| | [−499:−474] | [−473:−448] | [−445:−420] | [−419:−394] | [−392:−367] | |
| | RU 6 | RU 7 | RU 8 | RU 9 | | |
| | [−365:−340] | [−339:−314] | [−311:−286] | [−285:−260] | | |
| | RU 10 | RU 11 | RU 12 | RU 13 | RU 14 | |
| | [−252:−227] | [−226:−201] | [−198:−173] | [−172:−147] | [−145:−120] | |
| | RU 15 | RU 16 | RU 17 | RU 18 | RU 19 | |
| | [−118:−93] | [−92:−67] | [−64:−39] | [−38:−13] | [not defined] | |
| | RU 20 | RU 21 | RU 22 | RU 23 | RU 24 | |
| | [13:38] | [39:64] | [67:92] | [93:118] | [120:145] | |
| | RU 25 | RU 26 | RU 27 | RU 28 | | |
| | [147:172] | [173:198] | [201:226] | [227:252] | | |
| | RU 29 | RU 30 | RU 31 | RU 32 | RU 33 | |
| | [260:285] | [286:311] | [314:339] | [340:365] | [367:392] | |
| | RU 34 | RU 35 | RU 36 | RU 37 | | |
| | [394:419] | [420:445] | [448:473] | [474:499] | | |

TABLE 1-continued

| Logic RU | RU type | RU index and subcarrier range | | | |
|---|---|---|---|---|---|
| RU52 | RU 4 [−311:−260] | RU 1 [−499:−448] | RU 2 [−445:−394] | RU3 [−365:−314] | |
|  | RU 5 [−252:−201] | RU 6 [−198:−147] | RU 7 [−118:−67] | RU 8 [−64:−13] | |
|  | RU 9 [13:64] | RU 10 [67:118] | RU 11 [147:198] | RU 12 [201:252] | |
|  | RU 13 [260:311] | RU 14 [314:365] | RU 15 [394:445] | RU 16 [448:499] | |
| RU106 | RU 1 [−499:−394] | RU 2 [−365:−260] | RU 3 [−252:−147] | RU 4 [−118:−13] | |
|  | RU 5 [13:118] | RU 6 [147:252] | RU 7 [260:365] | RU 8 [394:499] | |
| RU242 | RU 1 [−500:−259] | RU 2 [−253:−12] | RU 3 [12:253] | RU 4 [259:500] | |
| RU484 | RU 1 [−500:−259, −253:−12] | RU 2 [12:253, 259:500] | | | |
| RU996 | RU 1 [−500:−3, 3:500] | | | | |

In some aspects, contiguous RU assignment would limit transmission power in a dRU, and the logic RUs are spread over the entire distribution bandwidth to maximize transmission power. Example tone sets used in dRU transmission are further discussed herein, such as with reference to FIG. 7 discussed below.

Figure 7:
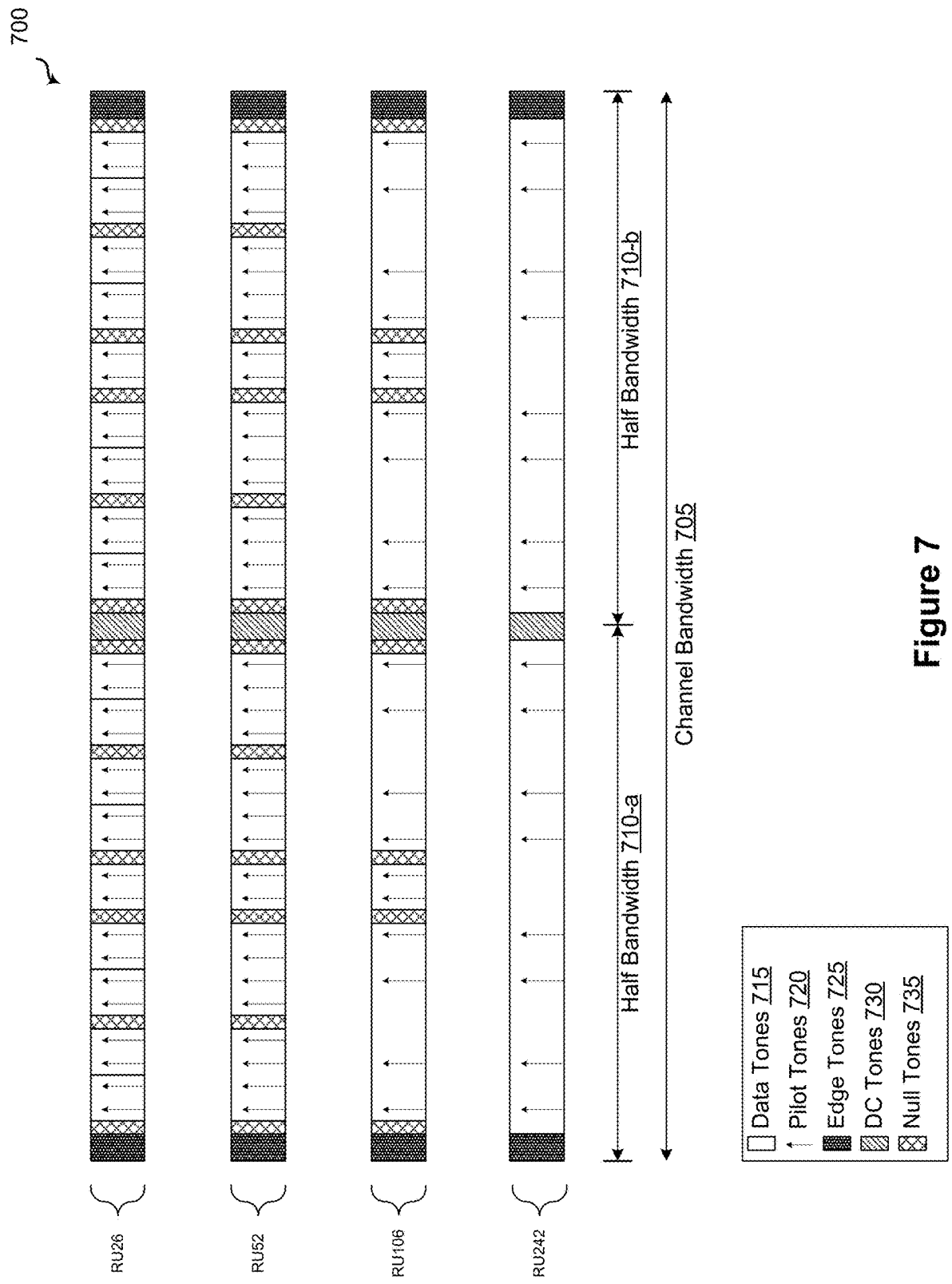
FIG. 7 shows an example channel bandwidth configuration usable for distributed resource unit (dRU) configurations, in accordance with some examples.

FIG. 7 shows an example channel bandwidth configuration 700 usable for dRU configurations including logic RUs having smaller sizes (for example, RU26) and logic RUs having larger sizes (for example, RU106). The channel bandwidth configuration 700 may define possible tone allocations for a channel bandwidth 705, which may be an example of the channel bandwidth 615 described herein, such as with reference to FIG. 6. The channel bandwidth configuration 700 may support transmission of data tones 715 and pilot tones 720 distributed across the channel bandwidth 705 for a quantity of dRUs.

The channel bandwidth 705 may include a set of allocatable tones (for example, tones carrying information, such as data or pilot signals) and a set of unallocated or extra tones (for example, tones not carrying data or pilot signals). The unallocated tones may act as a buffer or may be used for interference cancelation. In the example illustrated in FIG. 7, data tones and pilot tones 720 may be examples of allocatable tones, while edge tones 725, DC tone(s) 730, and null tones 735 may be examples of unallocated tones. In some aspects, the edge tones 725 may be referred to as leading unallocated edge tones and the edge tones 725 may be referred to as following or trailing unallocated edge tones. In some cases, some unallocated tones in logic RUs having smaller sizes may be data tones 715 in logic RUs having larger sizes. For example, RU242 does not include any null tones 735.

The DC tone(s) 730 may span a quantity of tones in a center of the channel bandwidth 705. In the illustrated example, the channel bandwidth 705 includes two half bandwidths 710 (for example, half bandwidth 710-a and half bandwidth 710-b), which, in some implementations, may be referred to as a negative half bandwidth 710-a and a positive half bandwidth 710-b. Each half bandwidth 710 may include a subset of the data tones 715 and a subset of the pilot tones 720 bordered by unallocated tones (for example, the edge tones 725 or a portion of the DC tone(s) 730). The data tones 715 and the pilot tones 720 may include tones allocated for multiple dRUs. In some aspects, some or all (for example, a majority) of the tones in the data tones 715 may be examples of groups of tones that are spread across at intervals across the half bandwidths 710-a and 710-b. The tones are spread out on an interval to minimize the peak-to-average power ratio (PAPR).

In some aspects, Table 2 illustrates dRU 610 utilizing tone sets 620-a and 620-b for distribution of EHT-LTF and EHT modulated data across a channel bandwidth 615. In some other aspects, Table 3 illustrates another dRU 610 utilizing different tone sets 620-a and 620-b for distribution of EHT-LTF and EHT modulated data across a channel bandwidth 615. Other dRUs 610, channel bandwidths 615, and distribution designs are possible and supported by wireless communication network 600. In some aspects, distribution designs and configurations for a dRU 610 having a higher bandwidth and a larger number of tones (for example, 52 tones, 102 tones, 242 tones, 484 tones, and 996 tones) are described herein with reference to Tables 4 and 5. Other distribution designs and configurations for a dRU 610 having different quantities of tones also fall within the scope of this disclosure.

TABLE 2

| Logic RU | dRU index and subcarrier range | | | | |
|---|---|---|---|---|---|
| RU26 i = 1:9 | dRU1 [−120:9:−12, 6:9:114] | dRU2 [−116:9:−8, 10:9:118] | dRU3 [−118:9:−10, 8:9:116] | dRU4 [−114:9:−6, 12:9:120] | dRU5 [−112:9:−4, 5:9:113] |
| | dRU6 [−119:9:−11, 7:9:115] | dRU7 [−115:9:−7, 11:9:119] | dRU8 [−117:9:−9, 9:9:117] | dRU9 [−113:9:−5, 4:9:112] | |

TABLE 2-continued

| Logic RU | dRU index and subcarrier range | |
|---|---|---|
| RU52 | dRU1 | dRU2 |
| i = 1:4 | 26-tone [dRU1, dRU2] | 26-tone [dRU3, dRU4] |
| | dRU3 | dRU4 |
| | 26-tone [dRU6, dRU7] | 26-tone [dRU8, dRU9] |
| RU106 | dRU1 | dRU2 |
| i = 1:2 | 26-tone [dRU1~4], [−3, 3] | 26-tone [dRU6~9], [−2, 2] |

TABLE 3

| Logic RU | dRU index and subcarrier range | | | | |
|---|---|---|---|---|---|
| RU26 | dRU1 | dRU2 | dRU3 | dRU4 | dRU5 |
| i = 1:9 | [−120:9:−12, 6:9:114] | [−116:9:−8, 10:9:118] | [−118:9:−10, 8:9:116] | [−114:9:−6, 12:9:120] | [−112:9:−4, 5:9:113] |
| | dRU6 | dRU7 | dRU8 | dRU9 | |
| | [−119:9:−11, 7:9:115] | [−115:9:−7, 11:9:119] | [−117:9:−9, 9:9:117] | [−113:9:−5, 4:9:112] | |
| RU52 | dRU1 | dRU2 | | | |
| i = 1:4 | 26-tone [dRU1, dRU2] | 26-tone [dRU3, dRU4] | | | |
| | dRU3 | dRU4 | | | |
| | 26-tone [dRU6, dRU7] | 26-tone [dRU8, dRU9] | | | |
| RU106 | dRU1 | dRU2 | | | |
| i = 1:2 | 26-tone [dRU1~4], [−3, 3] | 26-tone [dRU6~9], [−2, 2] | | | |

A tone pattern of the tone sets 620-a and 620-b is denoted by $EHTS_{A:B:C}$ notation and identifies a tone on every B subcarrier indices from subcarriers A to C. In some implementations, the tone pattern may not be contiguous and spread across the different half bandwidths 710-a and 710-b to accommodate DC tones and guard intervals. In this way, the EHTS notation can include a list of tone sets. For example, $dRU1_{[-118:9:-10,\ 8:9:116]}$ is a list of two sequences: tones −118 to −10 in 9 tone intervals and tones 8 to 116 in 9 tone intervals. For example, $dRU1_{[-118:9:-10,\ 8:9:116]}$ includes tones −118, −109, −100, −91, −82, −73, −64, −55, −46, −37, −28, −19, −10, 8, 17, 26, 35, 44, 53, 62, 71, 80, 89, 98, 107, and 116.

In some implementations, logic RUs with larger sizes (for example, RU52, RU106) can identify allocations of logic RUs with smaller sizes. For example, in both Tables 2 and 3, dRU1 of RU52 incorporates the dRU1 and dRU2 of RU26. In some implementations, logic RUs with larger sizes may also include additional tones that were not allocated to logic RUs with smaller sizes. For example, dRU1 in RU106 incorporates dRUs1-4 of RU26 and also incorporates tones −3 and 3. In some aspects, RUs with smaller sizes may not allocate each tone due to null subcarriers used for interference cancellation between different transmitting devices. Because larger logic RUs decrease the number of transmitting devices, some null subcarriers may not be required.

The channel bandwidth 615 may include a set of allocatable tones (for example, tones carrying information, such as data or pilot signals) and a set of unallocated or extra tones (for example, tones not carrying data or pilot signals). The unallocated tones may act as a buffer or may be used for interference cancelation. A 20 MHz band may include 242 tones may therefore include 234 allocatable tones from which the data tones may be selected for the dRU 610. Each tone set 620 may include 26 tones, such that two tone sets 620-a and 620-b may include 26 data tones for one dRU 610 (for example, a logic RU26).

In some implementations, the transmitting device may allocate a larger channel bandwidth 615 (for example, 40 MHz or 80 MHz) to the dRU 610 to obtain a frequency diversity gain and a transmit power advantage. For example, a maximum transmission power in a PSD limited band is 12 dBm for 20 MHz, 15 dBm for 40 MHz, and 18 dBm for 80 Mhz. In some aspects, the maximum transmission power may be lower due to unallocated tones (for example, null tones). Higher bandwidth can also accommodate larger logic RUs such as RU242, RU484 tones, and RU996. Table 4 below illustrates an example tone pattern of the tone sets 620-a and 620-b for distribution of EHT-LTF and EHT modulated data across a 40 MHz bandwidth and Table 5 illustrates an example tone pattern of the tone sets 620-a and 620-b for distribution of EHT-LTF and EHT modulated data across an 80 MHz bandwidth. Other distribution designs and configurations for a dRU 610 having different quantities of tones also fall within the scope of this disclosure.

TABLE 4

| Logic RU | dRU index and subcarrier range | | | | | |
|---|---|---|---|---|---|---|
| RU26 | dRU1 | dRU2 | dRU3 | dRU4 | dRU5 | dRU6 |
| i = 1:18 | [−242:18:−26, 10:18:226] | [−233:18:−17, 19:18:235] | [−238:18:−22, 14:18:230] | [−229:18:−13, 23:18:239] | [−225:18:−9, 27:18:243] | [−240:18:−24, 12:18:228] |
| | dRU7 | dRU8 | dRU9 | dRU10 | dRU11 | dRU12 |
| | [−231:18:−15, 21:18:237] | [−236:18:−20, 16:18:232] | [−227:18:−11, 25:18:241] | [−241:18:−25, 11:18:227] | [−232:18:−16, 20:18:236] | [−237:18:−21, 15:18:231] |
| | dRU13 | dRU14 | dRU15 | dRU16 | dRU17 | dRU18 |
| | [−228:18:−12, 24:18:240] | [−234:18:−18, 18:18:234] | [−239:18:−23, 13:18:229] | [−230:18:−14, 22:18:238] | [−235:18:−19, 17:18:233] | [−226:18:−10, 26:18:242] |

TABLE 4-continued

| Logic RU | dRU index and subcarrier range | | |
|---|---|---|---|
| RU52 i = 1:8 | dRU1 [−242:9:−17, 10:9:235] | dRU2 [−238:9:−13, 14:9:239] | dRU3 [−240:9:−15, 12:9:237] |
| | dRU4 [−236:9:−11, 16:9:241] | dRU5 [−241:9:−16, 11:9:236] | dRU6 [−237:9:−12, 15:9:240] |
| | dRU7 [−239:9:−14, 13:9:238] | dRU8 [−235:9:−10, 17:9:242] | |
| RU106 i = 1:4 | dRU1 26-tone [dRU1~4], [−8, 5] | dRU2 26-tone [dRU6~9], [−6, 7] | dRU3 26-tone [dRU10~13], [−7, 6] |
| | dRU4 26-tone [dRU15~18], [−5, 8] | | |
| RU242 i = 1:2 | dRU1 106-tone [dRU1~2], 26-tone dRU5, [−244, −4, 3, 9] | dRU2 106-tone [dRU3~4], 26-tone dRU14, [−243, −3, 4, 244] | |

TABLE 5

| Logic RU | dRU index and subcarrier range | | | |
|---|---|---|---|---|
| RU52 i = 1:16 | dRU1 [−483:36:−51, 17:36:449], [−467:36:−35, 33:36:465] | dRU2 [−475:36:−43, 25:36:457], [−459:36:−27, 41:36:473] | dRU3 [−479:36:−47, 21:36:453], [−463:36:−31, 37:36:469] | dRU4 [−471:36:−39, 29:36:461], [−455:36:−23, 45:36:477] |
| | dRU5 [−477:36:−45, 23:36:455], [−461:36:−29, 39:36:471] | dRU6 [−469:36:−37, 31:36:463], [−453:36:−21, 47:36:479] | dRU7 [−481:36:−49, 19:36:451], [−465:36:−33, 35:36:467] | dRU8 [−473:36:−41, 27:36:459], [−457:36:−25, 43:36:475] |
| | dRU9 [−482:36:−50, 18:36:450], [−466:36:−34, 34:36:466] | dRU10 [−474:36:−42, 26:36:458], [−458:36:−26, 42:36:474] | dRU11 [−478:36:−46, 22:36:454], [−462:36:−30, 38:36:470] | dRU12 [−470:36:−38, 30:36:462], [−454:36:−22, 46:36:478] |
| | dRU13 [−476:36:−44, 24:36:456], [−460:36:−28, 40:36:472] | dRU14 [−468:36:−36, 32:36:464], [−452:36:−20, 48:36:480] | dRU15 [−480:36:−48, 20:36:452], [−464:36:−32, 36:36:468] | dRU16 [−472:36:−40, 28:36:460], [−456:36:−24, 44:36:476] |
| RU106 i = 1:8 | dRU1 52-tone [dRU1~2], [−495, 485] | dRU2 52-tone [dRU3~4], [−491, 489] | dRU3 52-tone [dRU5~6], [−489, 491] | dRU4 52-tone [dRU7~8], [−493, 487] |
| | dRU5 52-tone [dRU9~10], [−494, 486] | dRU6 52-tone [dRU11~12], [−490, 490] | dRU7 52-tone [dRU13~14], [−488, 492] | dRU8 52-tone [dRU15~16], [−492, 488] |
| RU242 i = 1:4 | dRU1 [−499:4:−19, 17:4:497] | dRU2 [−497:4:−17, 19:4:499] | | |
| | dRU3 [−498:4:−18, 18:4:498] | dRU4 [−496:4:−16, 20:4:500] | | |
| RU484 i = 1:2 | dRU1 [−499:2:−17, 17:2:499] | dRU2 [−498:2:−16, 18:2:500] | | |

Additionally, or alternatively, the dRU 610 may be based on other factors. For example, a type of data or format of the data to be transmitted in the dRU 610 may determine the allocation of tones or the data tone mapping for the dRU 610. Uncompressed long training fields (LTFs) such as 4×LTFs may be used to transmit data in each pilot tone and each data tone of the sets of data tones. Compressed LTFs (for example, LTFs with a tone group factor, Ng, greater than 1, such as 1× or 2×LTFs) may transmit one value over a set of tones. For example, 2×LTF may transmit one value over a set of two tones (such as by using one tone of the set of two tones). In these cases, a transmitting device may support 2×LTF by transmitting one data tone in each group of data tones. In other cases, the devices may not use compressed LTFs and may transmit uncompressed 4×LTFs.

Figure 8:
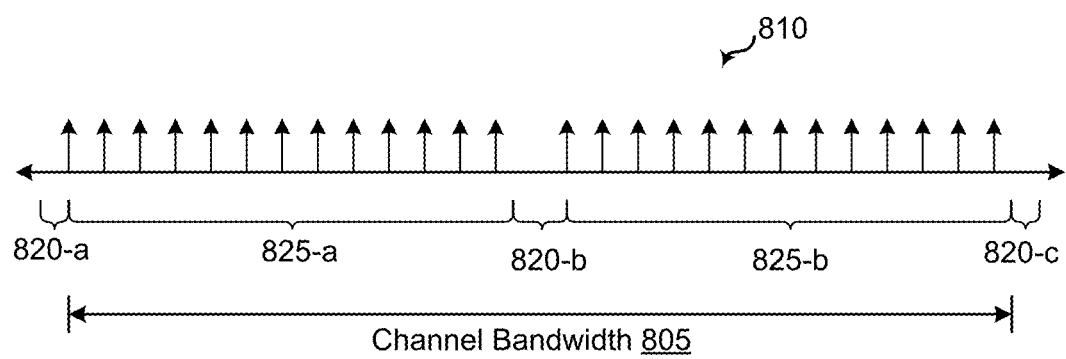
FIG. 8 shows an example tone mapping configuration usable for dRU configurations, in accordance with some examples.

FIG. 8 shows an example tone mapping configuration 800 usable for dRU configurations. The tone mapping configuration 800 illustrates an example of data tones 810 spread across the half bandwidth 825-*a* and half bandwidth 825-*b*. A channel bandwidth 805 may include unallocated tones (for example, including unallocated edge tones 820-*a* and 820-*c*, and unallocated DC tones 820-*b*) and allocatable tones (for example allocatable tones 825-*a* and 825-*b*). The allocatable tones may include a subset of data tones 810 that are evenly spaced across the half bandwidth 825-*a* and half bandwidth 825-*b*. For example, FIG. 8 may illustrate a dRU1 of logic RU26 in Table 2 and having a tone set pattern $dRU1_{[-118:9:-10,\ 8:9:116]}$, corresponding to tones −118 to −10 in 9 tone intervals and tones 8 to 116 in 9 tone intervals. For example, dRU1 may include tones −118, −109, −100, −91, −82, −73, −64, −55, −46, −37, −28, −19, −10, 8, 17, 26, 35, 44, 53, 62, 71, 80, 89, 98, 107, and 116.

Although the mapping configuration 800 is described herein with respect to a logic RU26, other sizes of logic RUs are supported as described above. In some implementations, larger RU sizes may be based on a smaller sized logic RU (such as an RU26). For example, to support dRUs with 52 tones, each logic RU52 may be composed of two logic RU26s (for example, the logic RU26 may be defined according to the tone mapping configurations discussed with reference to Tables 2, 3, 4, and 5).

In some aspects, the EHT-STF is used to determine an AGC setting, a DC estimation, and DC correction. For example, the EHT-STF depends on a periodicity and quantity to analyze the bandwidth to determine and set the AGC setting, the DC estimation, and the DC correction. In some examples, after setting the AGC setting, DC estimation, and DC correction, the EHT-LTF and EHT modulated data can be received.

In some aspects, in a UL TB PPDU with rRU mode, the EHT-STF is transmitted every 8 tones across to provide an accurate measurement of the entire bandwidth. The EHT-LTF can be used for channel estimations that are in turn used to demodulate symbols in the EHT modulated data based on the channel estimations. In the rRU mode, the EHT-STF is repeated eight times in the time domain in a symbol period of 12.8 μs and each EHT-STF has a period of 1.6 μs. The rRU mode has contiguous tones and a maximum power transmission is very limited in PSD-limited application. However, in dRU transmission, there is different tone spacing and maximum power transmission requirements that may affect transmissions of the EHT-STF.

In some aspects, the existing EHT-STF tones as defined in regular transmission may be used in the dRU transmission mode by transmitting the EHT-STF across the dRU spreading frequency. In other aspects, the EHT-STF may be configured to transmit across dRU spreading BW using existing STF tones for regular transmission.

In some aspects, the maximum transmission power of the EHT-STF is determined based on the number the signals and the bandwidth consumed by the signals in PSD limited frequency bands. For example, a maximum transmission PSD in a 6 GHz LPI frequency band may be −1 dBm per MHz for UL and the maximum power transmission may be determined by Equation 1:

$$P_{MAX} = 10\log_{10}\left(N \text{ tones} \times \frac{1 \text{ MHz}}{2 \text{ tones}}\right) - 1 \text{ dBm} \quad \text{(Equation 1)}$$

In some aspects, the EHT-STF for a TB PPDU is denoted by $EHTS_{-120:8:120}$ in a 20 MHz spectrum and includes 30 tones, the EHT-STF for a TB PPDU is denoted by $EHTS_{-248:8:248}$ in a 40 MHz spectrum and includes 62 tones, and the EHT-STF for a TB PPDU is denoted by $EHTS_{-504:8:504}$ in an 80 MHz spectrum and includes 126 tones. In each EHT-STF, the center tone $EHTS_0$ is the DC carrier and is not assigned. In this way, the maximum power transmission of the EHT-STF in a 20 MHz dRU is 10.76 dBm, the maximum power transmission of the EHT-STF in a 40 MHz dRU is 13.91 dBm, and the maximum power transmission of the EHT-STF in an 80 MHz dRU is 16.99 dBm.

The maximum transmission power for the EHT-STF and the maximum transmission power for EHT-LTF and EHT modulated data will be different due to the difference in the quantity of tones and tone distribution patterns. Table 5 below illustrates the maximum transmission power of different logic RU configurations across different bandwidths and Table 6 below illustrates the difference in the maximum transmission power of the EHT-STF and the maximum transmission power of the EHT-LTF and EHT modulated data.

TABLE 6

| Logic RU | 20 MHz (dBm) | 40 MHz (dBm) | 80 MHz (dBm) |
|---|---|---|---|
| RU26 | 10.21 dBm | 13.22 dBm | 13.22 dBm |
| RU52 | 11.46 dBm | 13.22 dBm | 16.23 dBm |
| RU106 | 11.74 dBm | 14.55 dBm | 16.31 dBm |
| RU242 | n/a | 14.46 dBm | 16.89 dBm |
| RU484 | n/a | n/a | 17.47 dBm |
| RU996 | n/a | n/a | n/a |

Table 7 below illustrates the difference in the maximum transmission power of the EHT-STF and the maximum transmission power of the EHT-LTF and EHT modulated data.

TABLE 7

| Logic RU | 20 MHz (dBm) | 40 MHz (dBm) | 80 MHz (dBm) |
|---|---|---|---|
| RU26 | −0.55 dBm | −0.69 dBm | −3.77 dBm |
| RU52 | 0.7 dBm | −0.69 dBm | −0.76 dBm |
| RU106 | 0.98 dBm | 0.64 dBm | −0.68 dBm |
| RU242 | n/a | 0.55 dBm | −0.1 dBm |
| RU484 | n/a | n/a | 0.48 dBm |
| RU996 | n/a | n/a | n/a |

In some aspects, the maximum power difference is 1 dB may not cause significant performance degradation based on an incorrect AGC setting and the device benefits by having a larger transmission power to transmit larger distances. Some such aspects may use an EHT-STF pattern from the rRU mode and spread the EHT-STF across every 8 tones in the dRU.

In some other aspects, the transmission power of the EHT-STF may be set to the transmission power of the EHT-LTF because regulatory measurements may average the dRU transmission over a larger period than the EHT-STF. In some aspects, when the regulatory agency captures the dRU data to ensure regulatory compliance, the spectral analysis is captured over 4000 packets and performs an averaging function that causes the EHT-STF transmission power to not affect the overall PSD. In such cases, the higher EHT-STF transmission power will not affect total transmission power and will comply with the regulatory agency requirements. In some aspects, the per-tone EHT-STF power will be equal to the total LTF power divided by the number of EHT-STF tones in the spreading bandwidth.

In some cases, transmitting the EHT-STF based on the rRU mode may lead to unintentional beamforming. In some examples, different wireless communication devices will spread over the same spreading bandwidth and use the same EHT-STF tone plan and may cause the EHT-STF to will overlap in the same spreading bandwidth and cause transmission tones for STF symbols to collide on each other. In such cases, the EHT-STF transmissions from different wireless communication devices may have the same channel response, such as additive white Gaussian noise (AWGN) with either the same or different sign, and may collide to affect the power measurement of the EHT-STF. In some examples, if two wireless communication devices have the same channel response and a different sign, the collision will cause the transmitted EHT-STF signals to cancel each other.

In some aspects, unintentional beamforming can be prevented or minimized by introducing a CSD to prevent collisions. In this way, each transmitting device may have a global CSD (e.g., a spatial stream CSD, which is a per stream CSD) that is unique and applied to the transmission of the EHT-STF in the dRU transmission mode, EHT-LTF, and EHT modulated data. For instance, a spatial stream CSD can be applied to all EHT modulated fields, including EHT-STF, EHT-LTF, and the modulated data. The transmission of the EHT-STF with a CSD is discussed herein, such as with reference to FIG. 9.

In some aspects, unintentional beamforming can be prevented or minimized by interleaving the EHT-STF tones. In such cases, each transmitting device may have a unique offset to apply to the EHT-STF in the rRU mode. The transmission of the EHT-STF with tone interleaving is discussed herein, such as with reference to FIG. 11.

In some aspects, the unintentional beamforming can be prevented or minimized by applying an orthogonal sequence to the EHT-STF in the rRU mode. In such cases, each transmitting device may apply a unique orthogonal sequence to minimize interference. The transmission of the EHT-STF with tone interleaving is discussed herein, such as with reference to FIG. 12.

In some aspects, the EHT-STF can be modified to be transmitted on the EHT-LTF dRU tones due to the different number of populated STF tones. In some cases, the EHT-STF tone plan can be modified to transmit the STF tones on the EHT-LTF and data dRU transmission tones. In this way, there will be no difference in maximum power transmission in the EHT-STF and the EHT-LTF. In some aspects, the dRU tones cannot maintain the STF periodicity at every 8 tones because the bandwidth is separated in a first half bandwidth 710-$a$ and a second half bandwidth 710-$b$ due to DC tones and guard interval tones. The periodicity may not significantly affect performance because packet detection is already completed, and periodicity may not be required. Periodicity of the EHT-STF is also not critical for the power measurement for setting the AGC gain. In some example, the receiving device may implement a notch filter to address the DC estimation and correction.

In such aspects, an EHT-STF is transmitted on the dRU tones in a 4×symbol duration while minimizing the PAPR. In such an example, the 4×EHT-LTF sequence is used as the new STF sequence. The STF sequence has a 12.8 µs length and a 3.2 µs cyclic prefix (CP) of can be added to fix the duration of the STF symbol duration to 16 µs, which is the duration of the EHT-LTF.

In some aspects, a transmitting device may be transmitting in a hybrid mode with both an rRU portion and a dRU portion, in which case symbol boundary alignment issues between these two portions can create transmission issues. For example, there can be misalignment at the STF symbol boundaries between the STF of the rRU and the STF of the dRU in one PPDU or aggregated PPDU (APPDU). In such examples, the STF for the rRU has a period of 8 µs and the STF for the dRU has a period of 16 µs. In such cases, the EHT-STF tones can be sent by rounding the dRU tone indices to multiples of 2 or 4 and sending the STF on the rounded tone. In some aspects, the STF obtains a periodicity of 8 µs or 4 µs and taking one or two periods forces the STF duration for the dRU to be 8 µs.

In some such cases, the STF tone index can be identified in Equation 2 for a 1×EHT-LTF sequence and Equation 3 for a 2×EHT-LTF sequence.

STF Tone Index=round(½*EHTLTF and data dRU tone index)*2    (Equation 2)

STF Tone Index=round(¼*EHTLTF and data dRU tone index)*4    (Equation 3)

In some aspects, the dRU tones can be rounded to the closest STF tones and the STF can be sent on the closed STF tones. In some aspects, the STF tone index can be identified in Equation 4 below. For example, a 4×EHT-LTF sequence is used for the STF tones identified in Equation 4.

STF Tone Index=round(⅛*EHTLTF and data dRU tone index)*8    (Equation 4)

In such aspects, the STF tones are transmitted with a periodicity, but the rounding may collide with tones transmitted from a nearby device and cause unintentional beamforming. To prevent colliding, a global CSD can be applied to the STF tones to prevent collision. The global CSD is described herein, such as with reference to FIG. 9. In such aspects, the number of STF tones for dRU is less than or equal to existing defined STF tones for rRU in a given bandwidth. In this way, the dRU tone mapping spread with this form of rounding is not as wide as an existing STF tone spread, which may lead to a larger power difference in a PSD limited frequency band. The transmission of the EHT-STF of the PPDU across a dRU spreading bandwidth using a tone plan and sequence of an EHT-LTF is discussed herein, such as with reference to FIG. 13.

In some aspects, the EHT-STF can be transmitted with periodicity by identifying evenly spaced tones defined in the existing rRU mode across the dRU spreading bandwidth. In such aspects, existing EHT-STF tones defined with respect to the rRU mode are identified $EHTS_{-120:8:120}$ in a 20 MHz spectrum and includes 30 tones and 9 different dRU configurations can be assigned with 3 or 4 STF tones each without collisions. The EHT-STF tones can be assigned to across the dRU spreading bandwidth to ensure even and fair spacing by using the EHT-STF tones defined in the rRU mode. In some aspects, the tones for the EHT-STF can be identified as a subset of the rRU EHT-STF tones, which include [−120 −112−104 −96−88 −80 −72−64 −56−48 −40−32 −24−16 −8 8 16 24 32 40 48 56 64 72 80 88 96 104 112 120]. The subset of EHT-STF tones for each logic RU26 dRU group and corresponding tones are identified in Table 8.

TABLE 8

| dRU | rRU STF tone subset | assigned STF Tone indicies | | | |
|---|---|---|---|---|---|
| dRU1 | $RU242_0$(1:9:end) | −120 | −48 | 32 | 104 |
| dRU2 | $RU242_0$(5:9:end) | −88 | −16 | 64 | n/a |
| dRU3 | $RU242_0$(3:9:end) | −104 | −32 | 48 | 120 |
| dRU5 | $RU242_0$(7:9:end) | −72 | 8 | 80 | n/a |
| dRU5 | $RU242_0$(9:9:end) | −56 | 24 | 96 | n/a |
| dRU6 | $RU242_0$(2:9:end) | −112 | −40 | 40 | 112 |
| dRU7 | $RU242_0$(6:9:end) | −80 | −8 | 72 | n/a |
| dRU8 | $RU242_0$(4:9:end) | −96 | −24 | 56 | n/a |
| dRU9 | $RU242_0$(8:9:end) | −64 | 16 | 88 | n/a |

In some aspects, logic RUs with larger sizes can be combined by incorporating logic RUs with smaller sizes. Table 9 below illustrates an example assignment of EHT-STF tones for transmission in the rRU mode across a 20 MHz bandwidth.

TABLE 9

| Logic RU | dRU index and corresponding STF subcarrier range | | | | |
|---|---|---|---|---|---|
| RU26 | dRU1<br>RU242_0<br>(1:9:end)<br>dRU2<br>RU242_0<br>(5:9:end) | dRU3<br>RU242_0<br>(3:9:end)<br>dRU4<br>RU242_0<br>(7:9:end) | dRU5<br>RU242_0<br>(9:9:end) | dRU6<br>RU242_0<br>(2:9:end)<br>dRU7<br>RU242_0<br>(6:9:end) | dRU8<br>RU242_0<br>(4:9:end)<br>dRU9<br>RU242_0<br>(8:9:end) |
| RU52 | dRU1<br>26-tone<br>[dRU1, dRU2] | dRU2<br>26-tone<br>[dRU3, dRU4] | | dRU3<br>26-tone<br>[dRU6, dRU7] | dRU4<br>26-tone<br>[dRU8, dRU9] |
| RU106 | dRU1<br>26-tone [dRU1~4] | | | dRU1<br>26-tone [dRU6~9] | |

In some other aspects, the existing STF tones for regular (e.g., rRU) transmissions over a dRU spreading bandwidth are evenly assigned to different dRUs, and the allocated STF tones for each dRU are approximately evenly distributed over the dRU spreading bandwidth. The number of STF tones assigned to the dRU is approximately equal to the number of STF tones for the corresponding rRU and each different dRU is assigned with distinct dRU tones that do not overlap. In some aspects, the allocation of the existing STF tones for each dRU can be based on a subset of dRU data tones that overlap with the existing STF tones in that dRU. In some other aspects, the allocation of the STF tones for each dRU can be based on rounding the dRU data tones to match the STF tones and transmit STF on the rounded data tones as STF tones for that dRU. In some other aspects, the allocation of the STF tones for each dRU can be based on shifting the selected dRU tones to the closest STF tones. For example, the STF tone selection can be selected from the rRU tones and the selected STF tones and the rRU tones will map together into the dRU tones. In such an example, the dRU tones corresponding to the selected STF tones will further be shifted to the closest defined STF tones for STF transmission within that dRU. As noted above, for rRU transmission, the EHT-STF is transmitted over the STF tones within its allocated rRU tones.

In some aspects, for larger bandwidths dRU, each 20 MHz is separated into a separate group and STF tones are assigned based on the RU242 allocation illustrated in Table 9 relative to that bandwidth. The transmission of the dRU EHT-STF on the STF stones defined in the rRU mode is discussed herein, such as with reference to FIG. 14.

Figure 9:
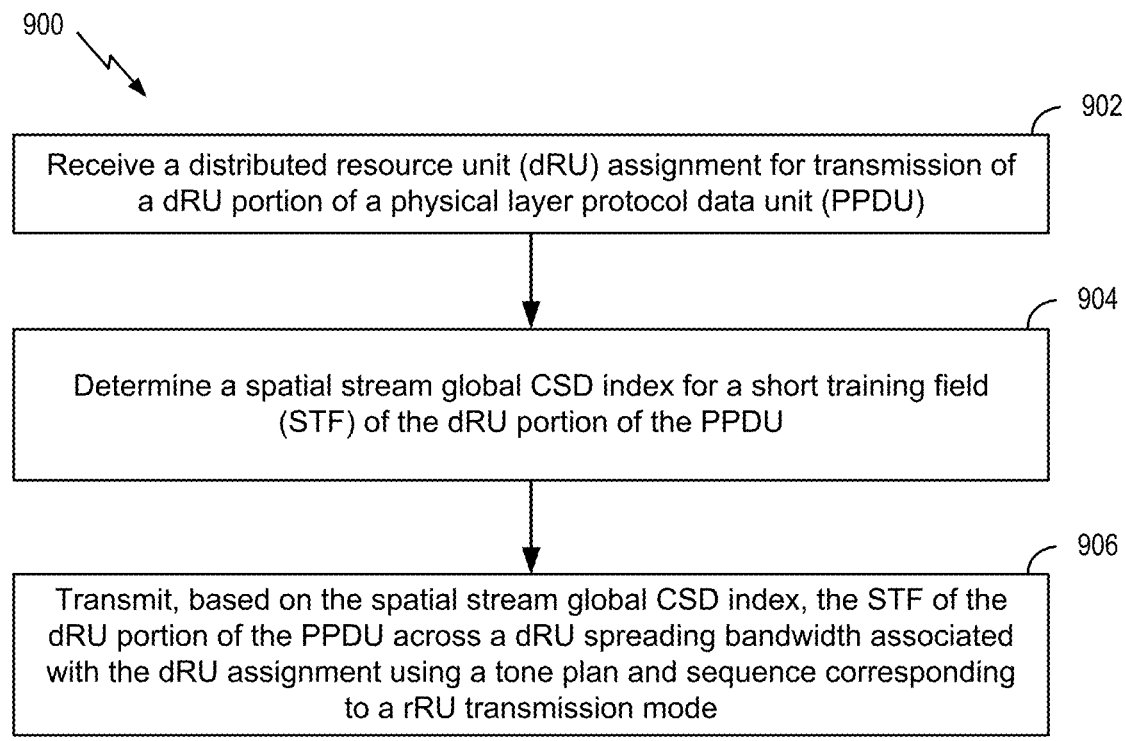
FIG. 9 shows a flowchart illustrating an example process for transmitting an Extremely High Throughput (EHT)-short training field (EHT-STF) using a regular resource unit (rRU) mode across a dRU spreading bandwidth, in accordance with some examples.

FIG. 9 shows a flowchart illustrating an example process 900 for transmitting an STF (e.g., an EHT-STF) using an rRU modes across a dRU spreading bandwidth according to some aspects. While the process 900 is described with respect to an EHT-STF, the process 900 can be performed for any type of STF. In some aspects, the process 900 may be performed by a wireless communication device such as the wireless communication device 400 described above with reference to FIG. 4. In some aspects, the process 900 may be performed by an AP or a STA, such as one of the APs 102 and 502 described above with reference to FIGS. 1 and 5A, respectively or a STA such as STA 104 or 504 described above with reference to FIGS. 1 and 5B respectively.

As described above, for example with respect to FIG. 7, transmitting the EHT-STF based on the STF tones and sequences defined in the existing rRU modes may lead to unintentional beamforming. For example, different STAs will spread over the same spreading bandwidth and use the same EHT-STF tone plan and may cause the EHT-STF overlap in the same spreading bandwidth and cause transmission tones for STF symbols to collide on each other. In such cases, if two STAs have the same channel response and a different sign, the collision will cause the signals to cancel each other, and the receiver will not measure the EHT-STF power properly. In some cases, the unintentional beamforming may be minimized by implementing delay diversity such as a CSD to prevent collisions.

In some aspects, in block 902, the wireless communication device receives a dRU assignment for transmission of a dRU portion of a PPDU. For example, the dRU assignment can be received from an AP or from a STA. In some examples, the dRU assignment is included in a user information field of the PPDU. In some aspects, the dRU assignment can include or be associated with a quantity of tones and a bandwidth configuration.

In some aspects, in block 904, the wireless communication device determines a spatial stream global CSD index for an EHT-STF of the dRU portion of the PPDU. In some aspects, in block 906, the wireless communication device transmits, based on the spatial stream global CSD index, the EHT-STF of the dRU portion across a dRU spreading bandwidth associated with the dRU assignment using a tone plan and sequence corresponding to the existing STF tones and STF sequence defined in regular transmission mode, which can be referred to herein as an rRU mode. In some cases, a phase ramp is applied to the EHT-STF in the frequency domain to create a time delay corresponding to the CSD. The STF tones are distributed across the dRU spreading frequency based on the rRU mode.

In some aspects, the wireless communication device may obtain a dRU assignment index allocated to the wireless communication device based on the dRU assignment. For example, the CSD start index can be determined based on the dRU assignment index and a maximum number of supported spatial streams (Nss_max) associated with a CSD table corresponding to the spatial stream global CSD index. In some examples, the maximum number of supported spatial streams is 8. In some examples, the maximum number of supported spatial streams may be 16 or other intervals. The wireless communication device may determine, based on the dRU assignment index and the spatial stream global CSD index, a CSD start index for the wireless communication device to transmit the EHT-STF across the dRU spreading bandwidth. The wireless communication device may transmit the EHT-STF across the dRU spreading bandwidth based on the CSD start index. Table 10 below illustrates a RU allocation subfield in an EHT variant user information field that can be used to identify a global RU index based on the number of supported spatial streams.

TABLE 10

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| 0-3: 80 MHz subblock where the RU is located | | 0-8 | 20, 40, 80, 160, or 320 | 26 | RU1 to RU9, respectively | 37 × N + RU index |
| | | 9-17 | 40, 80, 160, or 320 | | RU10 to RU18, respectively | |
| | | 18 | 80, 160, or 320 | | Reserved | |
| | | 19-36 | 80, 160, or 320 | | RU20 to RU37 respectively | |
| | | 37-40 | 20, 40, 80, 160, or 320 | 52 | RU1 to RU4, respectively | 16 × N + RU index |
| | | 41-44 | 40, 80, 160, or 320 | | RU5 to RU8, respectively | |
| | | 45-52 | 80, 160, or 320 | | RU9 to RU16, respectively | |
| | | 53, 54 | 20, 40, 80, 160, or 320 | 106 | RU1 and RU2, respectively | 8 × N + RU index |
| | | 55, 56 | 40, 80, 160, or 320 | | RU3 and RU4, respectively | |
| | | 57-60 | 80, 160, or 320 | | RU5 to RU8, respectively | |
| | | 61 | 20, 40, 80, 160, or 320 | 242 | RU1 | 4 × N + RU index |
| | | 62 | 40, 80, 160, or 320 | | RU2 | |
| | | 63, 64 | 80, 160, or 320 | | RU3 and RU4, respectively | |
| | | 65 | 40, 80, 160, or 320 | 484 | RU1 | 2 × N + RU index |
| | | 66 | 80, 160, or 320 | | RU2 | |
| | | 67 | 80, 160, or 320 | 996 | RU1 | N + RU index |
| 0-1: 160 MHz segment where the RU is located | 0 | 68 | Reserved | | | Reserved |
| | 1 | | 160 or 320 | 2 × 996 | RU1 | X1 + RU index |
| 0 | 0 | 69 | | Reserved | | Reserved |
| 0 | 1 | | | | | |
| 1 | 0 | | | | | |
| 1 | 1 | | 320 | 4 × 996 | RU1 | RU1 |
| 0-3: 80 MHz subblock where the RU is located | | 70-72 | 20, 40, 80, 160, or 320 | 52 + 26 | MRU1 to MRU3, respectively | 12 × N + MRU index |
| | | 73-75 | 40, 80, 160, or 320 | 52 + 26 | MRU4 to MRU6, respectively | |
| | | 76-81 | 80, 160, or 320 | 52 + 26 | MRU7 to MRU12, respectively | |
| | | 82, 83 | 20, 40, 80, 160, or 320 | 106 + 26 | MRU1 and MRU2, respectively | 8 × N + MRU index |
| | | 84, 85 | 40, 80, 160, or 320 | 106 + 26 | MRU3 and MRU4, respectively | |
| | | 86-89 | 80, 160, or 320 | 106 + 26 | MRU5 to MRU8, respectively | |
| | | 90-93 | 80, 160, or 320 | 484 + 242 | MRU1 to MRU4, respectively | 4 × N + MRU index |
| 0-1: 160 MHz segment where the MRU is located | 0 | 94, 95 | 160 or 320 | 996 + 484 | MRU1 and MRU2, respectively | 4 × X1 + MRU index |
| | 1 | | | | MRU3 and MRU4, respectively | |
| 0-1: 160 MHz segment where the MRU is located | 0 | 96-99 | 160 or 320 | 996 + 484 + 242 | MRU1 to MRU4, respectively | 8 × X1 + MRU index |
| | 1 | | | | MRU5 to MRU8, respectively | |
| 0 | 0 | 100-103 | 320 | 2 × 996 + 484 | MRU1 to MRU4, respectively | MRU index |
| 0 | 1 | | | | MRU5 and MRU6, respectively | |
| 1 | 0 | | | | MRU7 and MRU8, respectively | |
| 1 | 1 | | | | MRU9 to MRU12, respectively | |

TABLE 10-continued

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| 0 | 0 | 104 | 320 | 3 × 996 | MRU1 | MRU index |
| 0 | 1 | | | | MRU2 | |
| 1 | 0 | | | | MRU3 | |
| 1 | 1 | | | | MRU4 | |
| 0 | 0 | 105, 106 | 320 | 3 × 996 + 484 | MRU1 and MRU2, respectively | MRU index |
| 0 | 1 | | | | MRU3 and MRU4, respectively | |
| 1 | 0 | | | | MRU5 and MRU6, respectively | |
| 1 | 1 | | | | MRU7 and MRU8, respectively | |
| Any | Any | 107-127 | Any | Reserved | Reserved | Reserved |

For example, in a 20 MHz bandwidth, a maximum number of supported spatial streams (SS) Nss_max is 8 and there are 8 corresponding unique SS indexes. A different quantity of spatial streams is within the scope of this disclosure. Using the RU allocation field, the unique SS index can be obtained from a RU allocation subfield value. For example, a RU allocation subfield value of 1 indicates that the transmitting device is configured with RU26 and corresponds to a unique RU index of RU2. Similarly, a RU allocation subfield value of 38 indicates that the transmitting device is configured with RU52 and corresponds to a unique RU assignment index of RU2. In some aspects, the CSD start index is determined based the modulo of the RU assignment index (e.g., from a trigger frame) and the maximum number of support spatial streams Nss_max. Each unique SS index may be mapped to a CSD indicated in Table 11 below. In this way, each wireless communication device is assigned a distinct CSD and transmits the EHT-STF without interfering with other wireless communication devices.

TABLE 11

| | SS index | | | | | | | |
|---|---|---|---|---|---|---|---|---|
| | 1 | 2 | 3 | 4 | 5 | 6 | 7 | 8 |
| CSD (ns) | 0 | −400 | −200 | −600 | −350 | −650 | −100 | −750 |

In some other aspects, the wireless communication device obtains an AID allocated to the wireless communication device. The wireless communication device may determine, based on the AID and the spatial stream global CSD index, a CSD start index for the wireless communication device to transmit the EHT-STF across the dRU spreading bandwidth. The wireless communication device may transmit the EHT-STF across the dRU spreading bandwidth based on the CSD start index. In some aspects, the CSD start index is determined based on the AID and a maximum number of supported spatial streams associated with a CSD table corresponding to the spatial stream global CSD index. For example, the CSD start index may be the modulo of the AID and the maximum number of supported spatial streams Nss_max.

In some other aspects, the wireless communication device obtains a first tone index of the dRU assignment. The wireless communication device may determine, based on the spatial stream global CSD index and the first tone index, a CSD start index for the wireless communication device to transmit the EHT-STF across the dRU spreading bandwidth. The wireless communication device may transmit the EHT-STF across the dRU spreading bandwidth based on the CSD start index. In some aspects, the CSD start index is determined based on the first tone index and a maximum number of supported spatial streams associated with a CSD table corresponding to the spatial stream global CSD index. For example, the CSD start index may be the modulo of the first tone index of the dRU assignment and the maximum number of supported spatial streams Nss_max.

In some other aspects, the wireless communication device obtains a start tone offset associated with a dRU tone table corresponding to the dRU assignment (e.g., a start tone offset with respect to the first ($1^{st}$) data tone or first ($1^{st}$) dRU allocation). The wireless communication device may determine, based on the start tone offset and the spatial stream global CSD index, a CSD start index for the wireless communication device to transmit the EHT-STF across the dRU spreading bandwidth. The wireless communication device may transmit the EHT-STF across the dRU spreading bandwidth based on the CSD start index. In some aspects, the CSD start index is determined based on the start tone offset and a maximum number of supported spatial streams associated with a CSD table corresponding to the spatial stream global CSD index. For example, the CSD start index may be the modulo of the start tone offset and the maximum number of supported spatial streams Nss_max.

In some other aspects, the wireless communication device obtains, from a random number generator, a random number between 1 and the maximum number of supported spatial streams Nss_max. The maximum number of supported spatial streams Nss_max may be associated with a CSD table corresponding to the spatial stream global CSD index. The wireless communication device may determine a CSD start index for the wireless communication device as the random number. The wireless communication device may transmit the EHT-STF across the dRU spreading bandwidth based on the CSD start index. In such aspects, the random number may work for a dRU with a smaller number of tones (for example, RU26) and without any channel smoothing. In some aspects, if the CSD start index is not known to the receiving device, channel smoothing may not be performed for larger dRUs in some implementations.

In some aspects, the spatial stream global CSD index is assigned to one or more other wireless communication devices connected to the same AP. For example, each other wireless communication device connected to the same AP is assigned a different CSD start index to prevent collisions.

In some aspects, the wireless communication device sets a transmission power for the EHT-STF based on an LTF dRU transmission power. For example, the wireless communication device sets the transmission power for the EHT-STF to be the same as the LTF dRU transmission power or data power for distributed transmission on the dRU spreading bandwidth. In some other aspects, the wireless communication device sets a transmission power for the EHT-STF based on a power spectral density limitation.

In some aspects, transmitting the EHT-STF across the dRU spreading bandwidth using the tone plan and sequence corresponding to the rRU mode includes transmitting the EHT-STF every 8 tones of the dRU spreading bandwidth. In such cases, the dRU spreading bandwidth comprises an uplink power limit based on a power per MHz and, increasing the bandwidth allows higher uplink power and larger transmission ranges to be obtained. For example, in a 6 GHz LPI transmission scheme, the uplink power limit is −1 decibels per milliwatt (dBm) per MHz.

In some aspects, the PPDU that is transmitted by the wireless communication device includes a dRU and an rRU. In such cases, the rRU portion of the PPDU is transmitted based on a localized CSD index.

Figure 10:
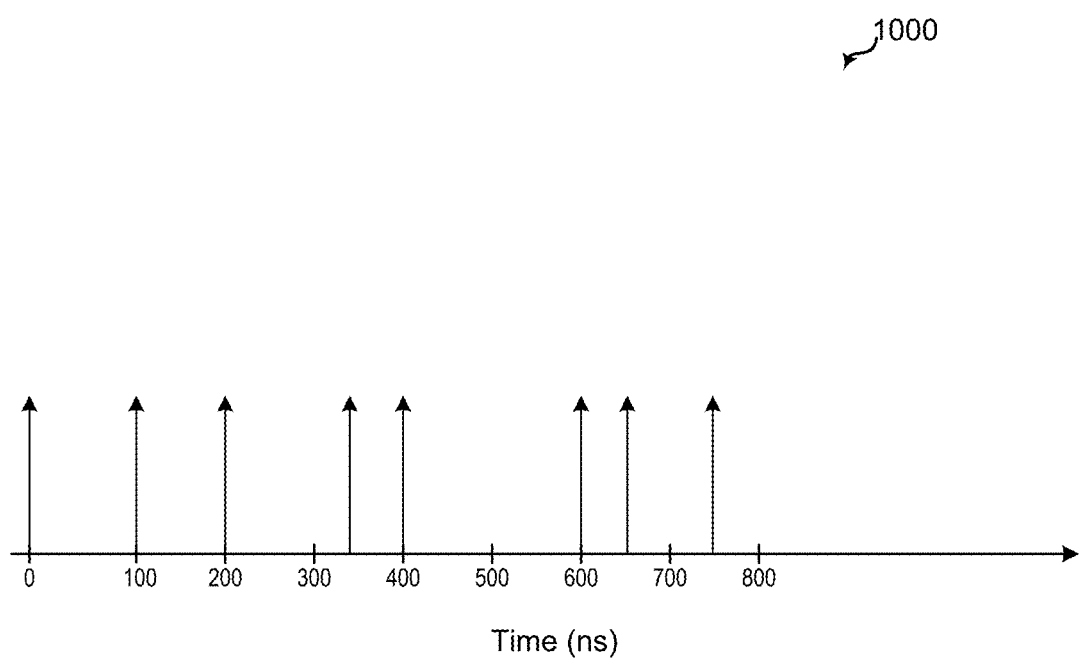
FIG. 10 illustrates a timing diagram for transmitting EHT-STF with a cyclic shift delay (CSD), in accordance with some examples.

FIG. 10 illustrates a timing diagram 1000 for transmitting EHT-STF with a cyclic shift delay (CSD). In some examples, the wireless communication devices may transmit the EHT-STF with CSD in the same frequency bandwidth to allow delay diversity to prevent the EHT-STF tones from colliding and interfering with other wireless communication devices. In some aspects, 8 wireless communication devices may transmit in the dRU bandwidth, and each has a distinct CSD delay selected to prevent collisions. For example, the distinct CSD delays may include 0 ns, −100 ns, −200 ns, −350 ns, −400 ns, −600 ns, −650 ns, and −750 ns. In some examples, the CSD delay values are optimized to minimize the power measurement error in some typical operating modes.

Figure 11:
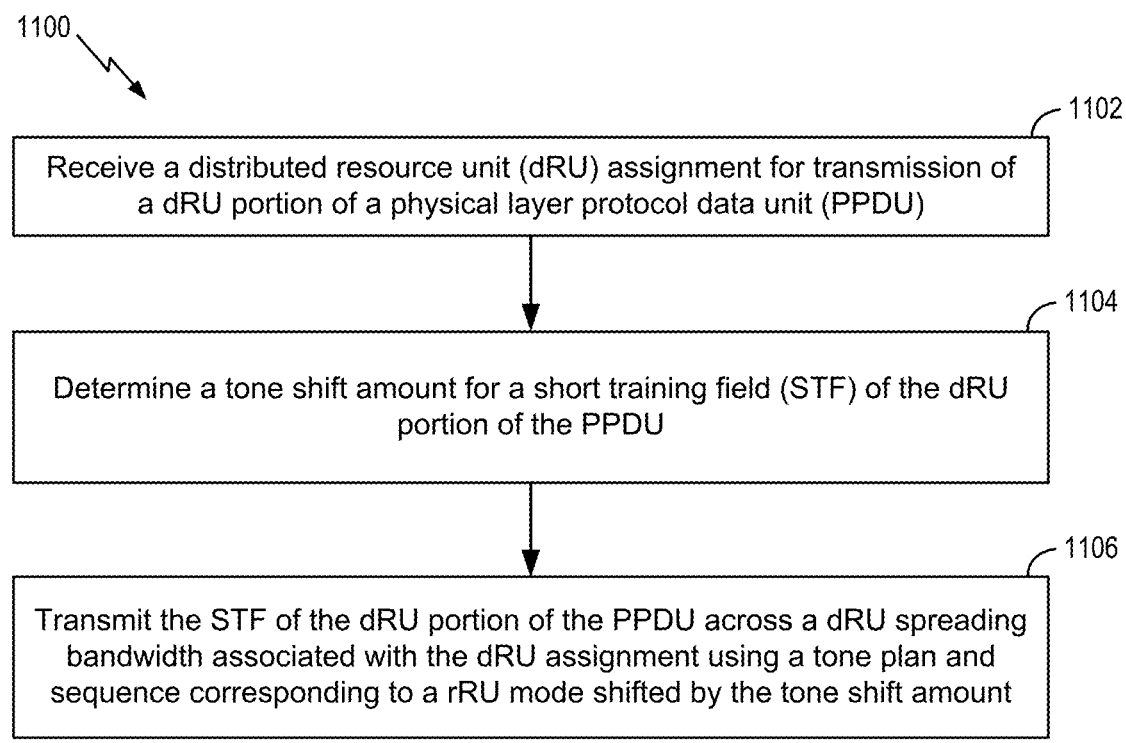
FIG. 11 shows a flowchart illustrating an example process for transmitting an EHT-STF using an rRU mode across a dRU spreading bandwidth, in accordance with some examples.

FIG. 11 shows a flowchart illustrating an example process 1100 for transmitting an STF (e.g., an EHT-STF) using an rRU mode across a dRU spreading bandwidth according to some aspects. While the process 1100 is described with respect to an EHT-STF, the process 1100 can be performed for any type of STF. In some aspects, the process 1100 may be performed by a wireless communication device such as the wireless communication device 400 described above with reference to FIG. 4. In some aspects, the process 1100 may be performed by an AP or a STA, such as one of the APs 102 and 502 described above with reference to FIGS. 1 and 5A, respectively or a STA such as STA 104 or 504 described above with reference to FIGS. 1 and 5B respectively.

As described above, for example with respect to FIG. 7, transmitting the EHT-STF based on the rRU mode may lead to unintentional beamforming. For example, different STAs will spread over the same spreading bandwidth and use the same EHT-STF tone plan and may cause the EHT-STF to will overlap in the same spreading bandwidth and cause transmission tones for STF symbols to collide on each other. In such cases, if two STAs have the same channel response and a different sign, the collision will cause the signals to cancel each other, and the receiver will not receive the EHT-STF. In some cases, the unintentional beamforming may be reduced or minimized by applying a tone shift and interleaving the EHT-STF tones.

In some aspects, in block 1102, the wireless communication device receives a dRU assignment for transmission of a dRU portion of a PPDU. Using the dRU, the wireless communication device can determine a unique identifier. In some aspects, the dRU assignment can be used to identify distinguishing information such as a SS index as described above with reference to FIG. 9. In other aspects an AID of the wireless communication device or the first tone index of the dRU assignment can be used as the distinguishing information.

In some aspects, in block 1104, the wireless communication device determines a tone shift amount for an EHT-STF of the dRU portion of the PPDU. For example, using the RU assignment index, the wireless communication device can determine to shift the tone amount based on a modulo of the RU assignment index and the interval of the tone spacing (or maximum number of supported spatial streams), which can be 8, 16, or other interval as noted above. In some other examples, the wireless communication device can shift the tone amount based on the AID allocated to the wireless communication device or shift the tone amount based on a start tone offset associated with a dRU tone table corresponding to the dRU assignment. In some other examples, the tone shift amount is determined based on a random number between 1 and the interval of the tone spacing or a maximum number of supported spatial streams, which can be 8, 16, or other interval as noted above.

In some aspects, in block 1106, the wireless communication device transmits the EHT-STF of the dRU portion across a dRU spreading bandwidth associated with the dRU assignment using a tone plan and sequence corresponding to an rRU mode shifted by the tone shift amount. Other wireless communication devices may each have a unique tone shift and will each transmit the EHT-STF using different tones to prevent collisions.

Figure 12:
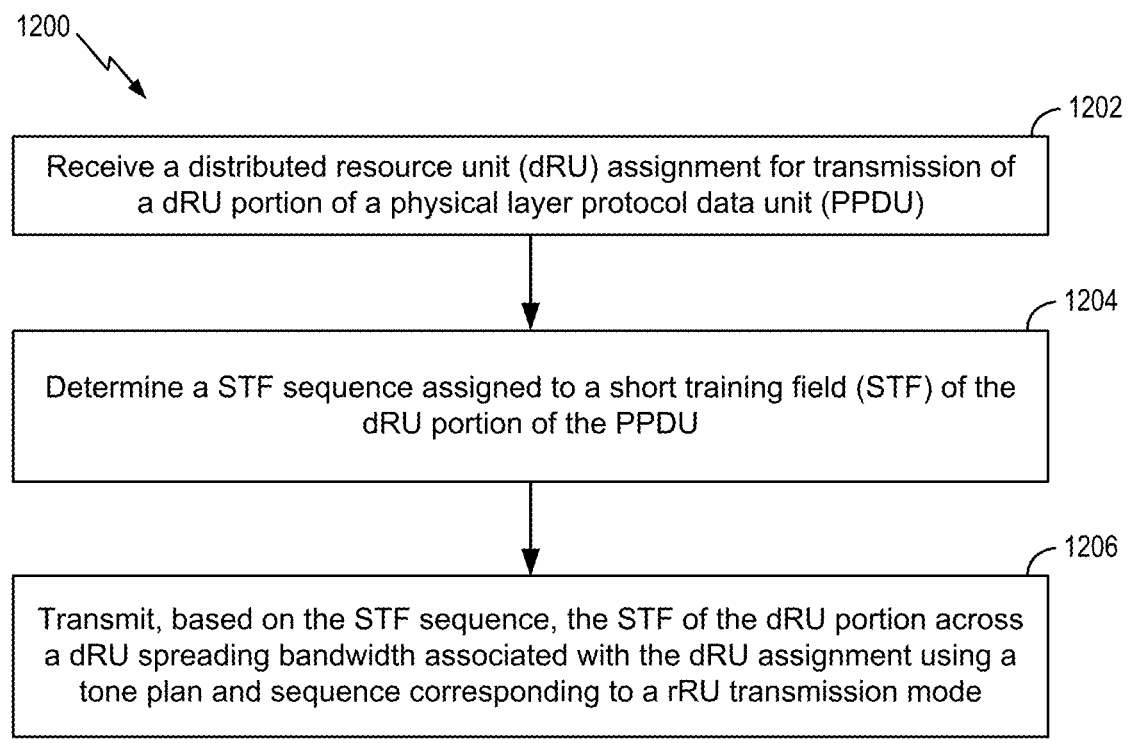
FIG. 12 shows a flowchart illustrating an example process for transmitting an EHT-STF using an rRU mode across a dRU spreading frequency, in accordance with some examples.

FIG. 12 shows a flowchart illustrating an example process 1200 for transmitting an STF (e.g., an EHT-STF) using an rRU mode across a dRU spreading frequency according to some aspects. While the process 1200 is described with respect to an EHT-STF, the process 1200 can be performed for any type of STF. In some aspects, the process 1200 may be performed by a wireless communication device such as the wireless communication device 400 described above with reference to FIG. 4. In some aspects, the process 1200 may be performed by an AP or a STA, such as one of the APs 102 and 502 described above with reference to FIGS. 1 and 5A, respectively or a STA such as STA 104 or 504 described above with reference to FIGS. 1 and 5B respectively.

As described above, for example with respect to FIG. 7, transmitting the EHT-STF based on the rRU mode may lead to unintentional beamforming that creates issues. For example, different STAs will spread over the same spreading bandwidth and use the same EHT-STF tone plan and may cause the EHT-STF to will overlap in the same spreading bandwidth and cause transmission tones for STF symbol to collide on each other. In such cases, if two STAs have the same channel response and a different sign, the collision will cause the signals to cancel each other, and the receiver will not receive the EHT-STF. In some cases, the unintentional beamforming may be reduced or minimized by applying an orthogonal sequence to the EHT-STF tones.

In some aspects, in block 1202, the wireless communication device receives a dRU assignment for transmission of a dRU portion of a PPDU. Using the dRU, the wireless communication device can determine a unique identifier. In some aspects, the dRU assignment can be used to identify distinguishing information such as an RU assignment index as described above with reference to FIG. 9. In other aspects an AID of the wireless communication device or the first tone index of the dRU assignment can be used as the distinguishing information.

In some aspects, in block 1204, the wireless communication device determines an STF sequence assigned to the wireless communication device for an EHT-STF of the dRU portion of the PPDU. In some aspects, the unique information of the wireless communication device can be used to select a unique STF sequence such as Hadamard codes or other codes that can be applied to the existing STF sequence to distinguish the wireless communication device from other wireless communication devices.

In some aspects, in block 1206, the wireless communication device transmits, based on the STF sequence, the EHT-STF of the dRU portion across a dRU spreading bandwidth associated with the dRU assignment using a tone plan and sequence corresponding to an rRU mode. For example, the wireless communication device applies the unique STF sequence assigned to the wireless communication device to an EHT-STF of the dRU portion of the PPDU and then transmits the EHT-STF. Each wireless communication device will apply the dRU will apply a different STF sequence to prevent EHT-STF collisions.

Figure 13:
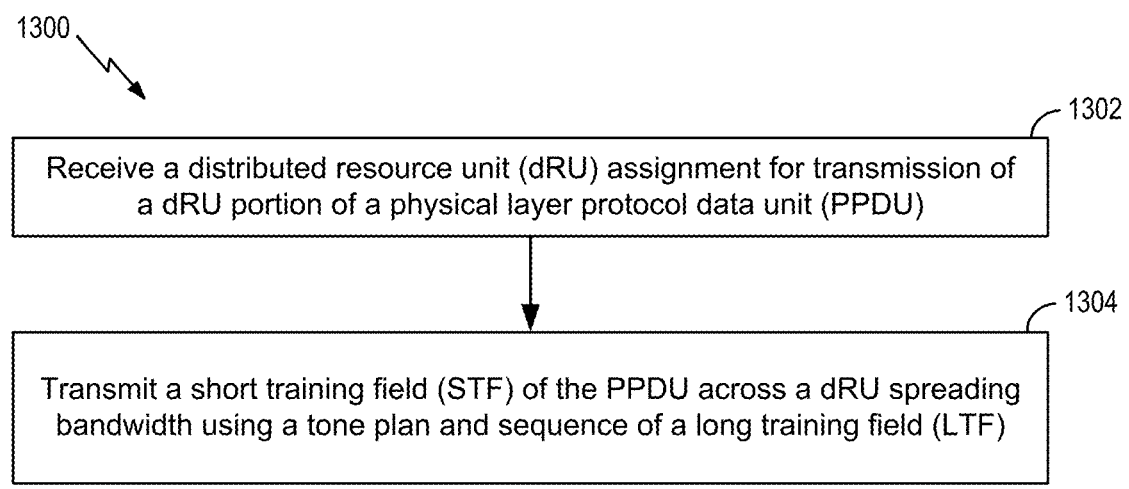
FIG. 13 shows a flowchart illustrating an example process for transmitting an EHT-STF of a PPDU across a dRU spreading bandwidth using a tone plan and sequence of an EHT-long training field (EHT-STF), in accordance with some examples.

FIG. 13 shows a flowchart illustrating an example process 1300 for transmitting an STF (e.g., an EHT-STF) of a PPDU across a dRU spreading bandwidth using a tone plan and sequence of an LTF (e.g., an EHT-LTF) according to some aspects. While the process 1300 is described with respect to an EHT-STF and an EHT-LTF, the process 1300 can be performed for any type of STF and/or LTF. In some aspects, the process 1300 may be performed by a wireless communication device such as the wireless communication device 400 described above with reference to FIG. 4. In some aspects, the process 1200 may be performed by an AP or a STA, such as one of the APs 102 and 502 described above with reference to FIGS. 1 and 5A, respectively or a STA such as STA 104 or 504 described above with reference to FIGS. 1 and 5B respectively.

In some aspects, in block 1302, the wireless communication device receives a dRU assignment for transmission of a dRU portion of a PPDU. Using the dRU, the wireless communication device can determine a unique identifier. In some aspects, the dRU assignment can be used to identify unique information of the wireless communication device such as a RU assignment index, an AID of the wireless communication device, a first tone index or start tone offset of the dRU assignment, as described above with reference to FIG. 9. In some aspects, the dRU assignment identifies the EHT-LTF configuration as illustrated in Tables 2-5 above.

In some aspects, in block 1304, the wireless communication device transmits an EHT-STF of the PPDU across a dRU spreading bandwidth using a tone plan and sequence of an EHT-LTF. In some aspects, the wireless communication device can round a plurality of tones of the dRU spreading bandwidth to a multiple and transmit the EHT-STF on the rounded plurality of tones of the dRU.

The sequence of the EHT-LTF can use a different period based on the multiple. For example, the EHT-STF can be transmitted using a 2×EHT-LTF sequence when the multiple corresponds to a value of 2. In some aspects, the EHT-STF can be transmitted using a 4×EHT-LTF sequence when the multiple corresponds to a value of 1. In some other aspects, the EHT-STF can be transmitted using a 1×EHT-LTF sequence when the multiple corresponds to a value of 4.

In some other aspects, the STF can be directly transmitted on the dRU tones and can include a 4×LTF sequence as the STF sequence. In such cases, a fixed-length cyclic prefix can be added to the EHT-STF to fix a symbol duration of the EHT-STF.

Figure 14:
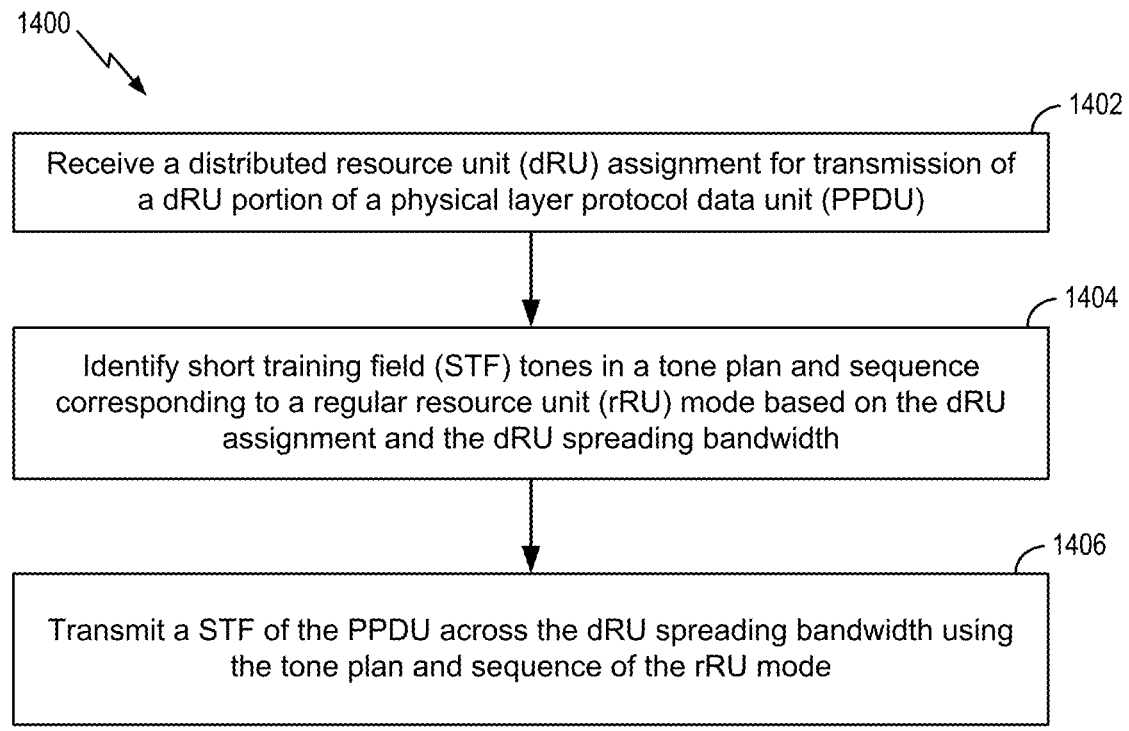
FIG. 14 shows a flowchart illustrating an example process for transmitting an EHT-STF of a PPDU across a dRU spreading bandwidth using a tone plan and sequence corresponding to an rRU mode, in accordance with some examples.

FIG. 14 shows a flowchart illustrating an example process 1400 for transmitting an STF (e.g., an EHT-STF) of a PPDU across a dRU spreading bandwidth using a tone plan and sequence of an rRU mode according to some aspects. While the process 1400 is described with respect to an EHT-STF, the process 1400 can be performed for any type of STF. In some aspects, the process 1400 may be performed by a wireless communication device such as the wireless communication device 400 described above with reference to FIG. 4. In some aspects, the process 1200 may be performed by an AP or a STA, such as one of the APs 102 and 502 described above with reference to FIGS. 1 and 5A, respectively or a STA such as STA 104 or 504 described above with reference to FIGS. 1 and 5B respectively.

In some aspects, in block 1402, the wireless communication device receives a dRU assignment for transmission of a dRU portion of a PPDU. Using the dRU, the wireless communication device can determine a unique identifier. In some aspects, the dRU assignment can be used to identify distinguishing information such as a RU assignment index as described above with reference to FIG. 9. In other aspects an AID of the wireless communication device or the first tone index of the dRU assignment can be used as the distinguishing information.

In some aspects, in block 1404, the wireless communication device identifies EHT-STF tones in the tone plan and sequence corresponding to the existing STF tones defined with regular transmission mode based on the dRU assignment and the dRU spreading bandwidth. In some aspects, the wireless communication device can use the dRU assignment identified in Table 10 and identify the STF tones identified in Tables 8 and 9. For example, the RU suballocation field illustrated in Table 10 can be used to identify the dRU assignment and the assigned STF tones for the EHT-STF can be identified in Tables 8 and 9.

In some aspects, in block 1406, the wireless communication device transmits an EHT-STF of the PPDU across the dRU spreading bandwidth using the existing STF tones defined from the regular transmission mode. In some aspects, the tones are evenly spread across the dRU spreading bandwidth and will not collide with other wireless communication devices.

In some other aspects, the existing STF tones for rRU transmissions are evenly assigned to different dRUs, and the allocated STF tones for each dRU are approximately evenly distributed over the dRU spreading bandwidth. The number of STF tones assigned to the dRU is approximately equal to the number of STF tones for the corresponding rRU and each different dRU is assigned with distinct dRU tones that do not overlap. In some aspects, the allocation of the existing STF tones for each dRU can be based on a subset of dRU data tones that overlap with the existing STF tones in that dRU. In some other aspects, the allocation of the STF tones for each dRU can be based on rounding the dRU data tones to match the STF tones and transmit STF on the rounded data tones as STF tones for that dRU. In some other aspects, the allocation of the STF tones for each dRU can be based on shifting the selected dRU tones to the closest STF tones. For example, the STF tone selection can be selected from the rRU tones and the selected STF tones and the rRU tones will map together into the dRU tones. In such an example, the dRU tones corresponding to the selected STF tones will further be shifted to the closest defined STF tones for STF transmission within that dRU. As noted above, for rRU transmission, the EHT-STF is transmitted over the STF tones within its allocated rRU tones.

Figure 15:
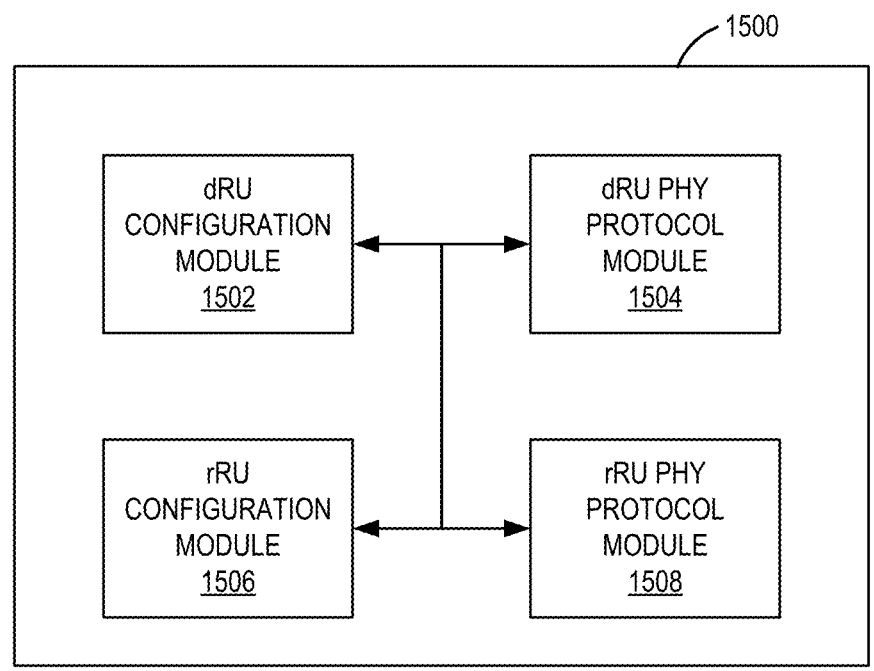
FIG. 15 shows a block diagram of an example wireless communication device configured to transmit an EHT-STF across a dRU spreading bandwidth, in accordance with some examples.

FIG. 15 shows a block diagram of an example wireless communication device 1500 configured to transmit an STF (e.g., an EHT-STF) across a dRU spreading bandwidth, according to some aspects. While operations of the wireless communication device 1500 are described with respect to an EHT-STF, the wireless communication device 1500 can perform similar operations for any type of STF. In some aspects, the wireless communication device 1500 is configured to perform one or more of the processes or EHT-STF configurations described above. The configurations can include the EHT-STF configuration using the rRU mode or using the EHT-LFT tone plan and sequence as described in FIG. 7 and the process 900 of FIG. 9, process 1100 of FIG. 11, process 1200 of FIG. 12, process 1300 of FIG. 13, and process 1400 of FIG. 14, as well as any other EHT-STF configuration or process described herein. The wireless communication device 1500 may be an example aspect of the wireless communication device 400 described above with reference to FIG. 4. For example, the wireless communication device 1500 can be a chip, SoC, chipset, package or device that includes at least one modem (for example, a Wi-Fi (IEEE 802.11) modem or a cellular modem such as the modem 402), at least one processor (such as the processor 404), at least one radio (such as the radio 406) and at least one memory (such as the memory 408). In some aspects, the wireless communication device 1500 can be a device for use in a STA, such as one of the STAs 104 and 504 described above with reference to FIGS. 1 and 5B, respectively. In some other aspects, the wireless communication device 1500 can be a STA that includes such a chip, SoC, chipset, package or device as well as at least one antenna (such as the antennas 525).

The wireless communication device 1500 may include a dRU configuration module 1502, a dRU PHY protocol module 1504, an rRU configuration module 1506, and an rRU PHY protocol module 1508. Portions of one or more of the modules 1502, 1504, 1506, and 1508 may be implemented at least in part in hardware or firmware. For example, the dRU configuration module 1504 may be implemented at least in part by one or more modems (for example, a Wi-Fi (IEEE 802.11) modem). In some aspects, at least some of the modules 1502, 1504, 1506, and 1508 are implemented at least in part as software stored in a memory. For example, portions of one or more of the modules 1502, 1504, 1506, and 1508 can be implemented as non-transitory instructions (or "code") executable by at least one processor to perform the functions or operations of the respective module.

The dRU configuration module 1504 may be configured to configure the dRU allocation such as the configuration of tones based on a dRU assignment. As described herein, the dRU configuration module 1502 may also configure the EHT-STF for configuration in the rRU mode or using the EHT-LTF sequence. The dRU PHY protocol module 1504 may be configured to set the power of the EHT-STF based on the number of tones or based on the EHT-LTF.

The rRU configuration module 1506 may be configured the rRU allocation for a non-distributed transmission across a bandwidth that is not limited by PSD. The rRU configuration module 1406 may provide the dRU configuration module 1502 with information related to transmitting the EHT-STF in the rRU mode. The rRU PHY protocol module 1508 may configure transmission of rRU signals based on the rRU mode.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Illustrative aspects of the present disclosure include:

Aspect 1. A method of wireless communication by a wireless communication device, comprising: receiving a dRU assignment for transmission of a dRU portion of a PPDU; determining a spatial stream global CSD index for an STF of the dRU portion of the PPDU; and transmitting, based on the spatial stream global CSD index, the STF of the dRU portion of the PPDU across a dRU spreading bandwidth associated with the dRU assignment using a tone plan and sequence corresponding to a rRU transmission mode.

Aspect 2. The method of Aspect 1, wherein the PPDU includes a long training field (LTF) and a data field, and further comprising setting a transmission power for the STF based on a transmission power associated with the LTF and the data field of the PPDU.

Aspect 3. The method of Aspect 2, further comprising setting the transmission power for the STF to be the same as the transmission power associated with the LTF and the data field of the PPDU.

Aspect 4. The method of any of Aspects 1 to 3, further comprising setting a transmission power for the STF based on a power spectral density limitation.

Aspect 5. The method of any of Aspects 1 to 4, wherein determining the spatial stream global CSD index comprises: obtaining a dRU assignment index allocated to the wireless communication device based on the dRU assignment; and determining, based on the dRU assignment index and the spatial stream global CSD index, a CSD start index for the wireless communication device; wherein the STF is transmitted across the dRU spreading bandwidth based on the CSD start index.

Aspect 6. The method of Aspect 5, wherein the CSD start index is based on the dRU assignment index and a maximum number of supported spatial streams associated with a CSD table corresponding to the spatial stream global CSD index.

Aspect 7. The method of any of Aspects 1 to 6, further comprising: determining, based on an association identifier (AID) associated with the wireless communication device and the spatial stream global CSD index, a CSD start index for the wireless communication device; wherein the STF is transmitted across the dRU spreading bandwidth based on the CSD start index.

Aspect 8. The method of Aspect 7, wherein the CSD start index is based on the AID and a maximum number of supported spatial streams associated with a CSD table corresponding to the spatial stream global CSD index.

Aspect 9. The method of any of Aspects 1 to 8, further comprising: determining, based on a first tone index of the dRU assignment and the spatial stream global CSD index, a CSD start index for the wireless communication device; wherein the STF is transmitted across the dRU spreading bandwidth based on the CSD start index.

Aspect 10. The method of Aspect 9, wherein the CSD start index is based on the first tone index and a maximum number of supported spatial streams associated with a CSD table corresponding to the spatial stream global CSD index.

Aspect 11. The method of any of Aspects 1 to 10, further comprising: determining, based on a start tone offset associated with a dRU tone table corresponding to the dRU assignment and the spatial stream global CSD index, a CSD start index for the wireless communication device; wherein the STF is transmitted across the dRU spreading bandwidth based on the CSD start index.

Aspect 12. The method of Aspect 11, wherein the CSD start index is based on the start tone offset and a maximum number of supported spatial streams associated with a CSD table corresponding to the spatial stream global CSD index.

Aspect 13. The method of any of Aspects 1 to 12, further comprising: determining a CSD start index for the wireless communication device to transmit the STF as a random number between 1 and a maximum number of supported spatial streams associated with a CSD table corresponding to the spatial stream global CSD index; wherein transmitting the STF is transmitted across the dRU spreading bandwidth based on the CSD start index.

Aspect 14. The method of any of Aspects 1 to 13, wherein the spatial stream global CSD index is assigned to one or more other wireless communication device connected to a same AP, and wherein a different CSD start index is assigned to each wireless communication device connected to the same AP.

Aspect 15. The method of any of Aspects 1 to 14, wherein transmitting the STF across the dRU spreading bandwidth using the tone plan and sequence corresponding to the rRU mode includes transmitting the STF every 8 tones of the dRU spreading bandwidth.

Aspect 16. The method of any of Aspects 1 to 15, wherein the dRU spreading bandwidth comprises an uplink power limit based on a power per MHz.

Aspect 17. The method of Aspect 16, wherein the uplink power limit is −1 dBm per MHz.

Aspect 18. The method of any of Aspects 1 to 17, wherein the PPDU includes a dRU and an rRU, and further comprising: transmitting the rRU of the PPDU based on a localized CSD index.

Aspect 19: A wireless communication device including at least one modem (for example, implemented in circuitry), a processor (or processors) coupled to the transceiver, and at least one memory communicatively coupled with the at least one processor and storing processor-readable code. The processor-readable code, when executed by the at least one processor in conjunction with the at least one modem, is configured to: receive a dRU assignment for transmission of a dRU portion of a PPDU; determine a spatial stream global CSD index for an STF of the dRU portion of the PPDU; and transmitting, based on the spatial stream global CSD index, the STF of the dRU portion of the PPDU across a dRU spreading bandwidth associated with the dRU assignment using a tone plan and sequence corresponding to a rRU transmission mode.

Aspect 20: The wireless communication device of Aspect 19, wherein the PPDU includes a long training field (LTF) and a data field, and wherein the processor-readable code, when executed by the at least one processor in conjunction with the at least one modem, is configured to: set a transmission power for the STF based on a transmission power associated with the long training field (LTF) and the data field of the PPDU.

Aspect 21: The wireless communication device of Aspect 20, wherein the processor-readable code, when executed by the at least one processor in conjunction with the at least one modem, is configured to: set the transmission power for the STF to be the same as the transmission power associated with the LTF and the data field of the PPDU.

Aspect 22: The wireless communication device of any of Aspects 19 to 21, wherein the processor-readable code, when executed by the at least one processor in conjunction with the at least one modem, is configured to: set a transmission power for the STF based on a power spectral density limitation.

Aspect 23: The wireless communication device of any of Aspects 19 to 22, wherein the processor-readable code, when executed by the at least one processor in conjunction with the at least one modem, is configured to: obtain a dRU assignment index allocated to the wireless communication device based on the dRU assignment; determine, based on the dRU assignment index and the spatial stream global CSD index, a CSD start index for the wireless communication device; and transmit the EHT-STF across the dRU spreading bandwidth based on the CSD start index.

Aspect 24: The wireless communication device of any of Aspects 19 to 23, wherein the processor-readable code that, when executed by the at least one processor in conjunction with the at least one modem, is configured to determine the CSD start index based on the dRU assignment index and a maximum number of supported spatial streams associated with a CSD table corresponding to the spatial stream global CSD index.

Aspect 25: The wireless communication device of any of Aspects 19 to 24, wherein the processor-readable code, when executed by the at least one processor in conjunction with the at least one modem, is configured to: determine, based on an association identifier (AID) associated with the wireless communication device and the spatial stream global CSD index, a CSD start index for the wireless communication device; and transmit the EHT-STF across the dRU spreading bandwidth based on the CSD start index.

Aspect 26: The wireless communication device of any of Aspects 19 to 25, wherein the processor-readable code that, when executed by the at least one processor in conjunction with the at least one modem, is configured to determine the CSD start index based on the AID and a maximum number of supported spatial streams associated with a CSD table corresponding to the spatial stream global CSD index.

Aspect 27: The wireless communication device of any of Aspects 19 to 26, wherein the processor-readable code, when executed by the at least one processor in conjunction with the at least one modem, is configured to: determine, based on a first tone index of the dRU assignment and the spatial stream global CSD index, a CSD start index for the wireless communication device; and transmit the EHT-STF across the dRU spreading bandwidth based on the CSD start index.

Aspect 28: The wireless communication device of any of Aspects 19 to 27, wherein the processor-readable code that, when executed by the at least one processor in conjunction with the at least one modem, is configured to determine the CSD start index based on the first tone index and a maximum number of supported spatial streams associated with a CSD table corresponding to the spatial stream global CSD index.

Aspect 29: The wireless communication device of any of Aspects 19 to 28, wherein the processor-readable code, when executed by the at least one processor in conjunction with the at least one modem, is configured to: determine, based on a start tone offset associated with a dRU tone table corresponding to the dRU assignment and the spatial stream global CSD index, a CSD start index for the wireless communication device; and transmit the EHT-STF across the dRU spreading bandwidth based on the CSD start index.

Aspect 30: The wireless communication device of any of Aspects 19 to 29, wherein the processor-readable code, when executed by the at least one processor in conjunction with the at least one modem, is configured to determine the CSD start index based on the start tone offset and a maximum number of supported spatial streams associated with a CSD table corresponding to the spatial stream global CSD index.

Aspect 31: The wireless communication device of any of Aspects 19 to 30, wherein the processor-readable code, when executed by the at least one processor in conjunction with the at least one modem, is configured to: determine a CSD start index for the wireless communication device as a random number between 1 and a maximum number of supported spatial streams associated with a CSD table corresponding to the spatial stream global CSD index; and transmit the STF across the dRU spreading bandwidth based on the CSD start index.

Aspect 32: The wireless communication device of any of Aspects 19 to 31, wherein the spatial stream global CSD index is assigned to one or more other wireless communication device connected to a same AP, and wherein a different CSD start index is assigned to each wireless communication device connected to the same AP.

Aspect 33: The wireless communication device of any of Aspects 19 to 32, wherein, to transmit the STF across the dRU spreading bandwidth using the tone plan and sequence corresponding to the rRU mode, wherein the processor-readable code that, when executed by the at least one processor in conjunction with the at least one modem, is configured to transmit the STF every 8 tones of the dRU spreading bandwidth.

Aspect 34: The wireless communication device of any of Aspects 19 to 33, wherein the dRU spreading bandwidth comprises an uplink power limit based on a power per MHz.

Aspect 35: The wireless communication device of any of Aspects 19 to 34, wherein the uplink power limit is −1 dBm per MHz.

Aspect 36: The wireless communication device of any of Aspects 19 to 35, wherein the processor-readable code, when executed by the at least one processor in conjunction with the at least one modem, is configured to: transmit the rRU of the PPDU based on a localized CSD index.

Aspect 37. A method of wireless communication by a wireless communication device, comprising: receiving a dRU assignment for transmission of a dRU portion of a PPDU; determining a tone shift amount for an STF of the dRU portion of the PPDU.

Aspect 38. The method of Aspect 37, further comprising: obtaining a dRU assignment index allocated to the wireless communication device; and determining the tone shift amount based on the dRU assignment index.

Aspect 39. The method of any of Aspects 37 to 38, wherein the tone shift amount is based on the dRU assignment index and 8.

Aspect 40. The method of any of Aspects 37 to 39, further comprising: obtaining an AID allocated to the wireless communication device; and determining the tone shift amount based on the AID.

Aspect 41. The method of any of Aspects 37 to 40, wherein the tone shift amount is based on the AID and 8.

Aspect 42. The method of any of Aspects 37 to 41, further comprising: obtaining a first tone index of the dRU assignment; and determining the tone shift amount based on the first tone index.

Aspect 43. The method of any of Aspects 37 to 42, wherein the tone shift amount is based on the first tone index and a maximum number of supported spatial streams.

Aspect 44. The method of any of Aspects 37 to 43, further comprising: obtaining a start tone offset associated with a dRU tone table corresponding to the dRU assignment; and determining the tone shift amount based on the start tone offset.

Aspect 45. The method of any of Aspects 37 to 44, wherein the tone shift amount is based on the start tone offset and a maximum number of supported spatial streams.

Aspect 46. The method of any of Aspects 37 to 45, further comprising: determining the tone shift amount as a random number between 1 and a maximum number of supported spatial streams.

Aspect 47: A wireless communication device including at least one modem (for example, implemented in circuitry), a processor (or processors) coupled to the transceiver, and at least one memory communicatively coupled with the at least one processor and storing processor-readable code. The processor-readable code, when executed by the at least one processor in conjunction with the at least one modem, is configured to: receive a dRU assignment for transmission of a dRU portion of a PPDU; determine a tone shift amount for an STF of the dRU portion of the PPDU; and transmit the STF of the dRU portion of the PPDU across a dRU spreading bandwidth associated with the dRU assignment using a tone plan and sequence corresponding to a rRU mode shifted by the tone shift amount.

Aspect 48: The wireless communication device of Aspect 47, wherein the processor-readable code, when executed by the at least one processor in conjunction with the at least one modem, is configured to: obtain a dRU assignment index allocated to the wireless communication device based on the dRU assignment in a user information field, wherein the dRU assignment identifies the dRU assignment including a quantity of tones and a bandwidth configuration of the dRU assignment; and determine the tone shift amount based on the dRU assignment index.

Aspect 49: The wireless communication device of any of Aspects 47 to 48, wherein the tone shift amount is based on the dRU assignment index and 8.

Aspect 50: The wireless communication device of any of Aspects 47 to 49, wherein the processor-readable code, when executed by the at least one processor in conjunction with the at least one modem, is configured to: obtain an AID allocated to the wireless communication device; and determine the tone shift amount based on the AID.

Aspect 51: The wireless communication device of any of Aspects 47 to 50, wherein the tone shift amount is based on the AID and 8.

Aspect 52: The wireless communication device of any of Aspects 47 to 51, wherein the processor-readable code, when executed by the at least one processor in conjunction with the at least one modem, is configured to: obtain a first tone index of the dRU assignment; and determine the tone shift amount based on the first tone index.

Aspect 53: The wireless communication device of any of Aspects 47 to 52, wherein the tone shift amount is based on the first tone index and a maximum number of supported spatial streams.

Aspect 54: The wireless communication device of any of Aspects 47 to 53, wherein the processor-readable code, when executed by the at least one processor in conjunction with the at least one modem, is configured to: obtain a start tone offset associated with a dRU tone table corresponding to the dRU assignment; and determine the tone shift amount based on the start tone offset.

Aspect 55: The wireless communication device of any of Aspects 47 to 54, wherein the tone shift amount is based on the start tone offset and a maximum number of supported spatial streams.

Aspect 56: The wireless communication device of any of Aspects 47 to 55, wherein the processor-readable code, when executed by the at least one processor in conjunction with the at least one modem, is configured to: determine the tone shift amount as a random number between 1 and a maximum number of supported spatial streams.

Aspect 57. A method of wireless communication by a wireless communication device, comprising: receiving a dRU assignment for transmission of a dRU portion of a PPDU; determining a STF sequence assigned to the wireless communication device for an STF of the dRU portion of the PPDU; and transmitting, based on the STF sequence, the STF of the dRU portion of the PPDU across a dRU spreading bandwidth associated with the dRU assignment using a tone plan and sequence corresponding to a rRU transmission mode.

Aspect 58. The method of Aspect 57, wherein determining the STF sequence assigned to the wireless communication device includes applying an orthogonal sequence to the STF of the dRU portion of the PPDU based on the dRU assignment.

Aspect 59. The method of any of Aspects 57 to 58, wherein the orthogonal sequence includes a Hadamard code.

Aspect 60: A wireless communication device including at least one modem (for example, implemented in circuitry), a processor (or processors) coupled to the transceiver, and at least one memory communicatively coupled with the at least one processor and storing processor-readable code. The processor-readable code, when executed by the at least one processor in conjunction with the at least one modem, is configured to: receive a dRU assignment for transmission of a dRU portion of a PPDU; determine a STF sequence assigned to the wireless communication device for an STF of the dRU portion of the PPDU; and transmitting, based on the STF sequence, the STF of the dRU portion across a dRU spreading bandwidth associated with the dRU assignment using a tone plan and sequence corresponding to a rRU transmission mode.

Aspect 61: The wireless communication device of Aspect 60, wherein determining the STF sequence assigned to the wireless communication device includes applying an orthogonal sequence to the STF of the dRU portion of the PPDU based on the dRU assignment.

Aspect 62: The wireless communication device of any of Aspects 60 to 61, wherein the orthogonal sequence includes a Hadamard code.

Aspect 63. A method of wireless communication by a wireless communication device, comprising: receiving a dRU assignment for transmission of a PPDU; and transmitting an STF of the PPDU across a dRU spreading bandwidth using a tone plan and sequence of an long training field (LTF).

Aspect 64. The method of Aspect 63, wherein transmitting the STF of the PPDU across the dRU spreading bandwidth includes transmitting the STF directly on a plurality of tones of the dRU spreading bandwidth.

Aspect 65. The method of any of Aspects 63 to 64, further comprising transmitting the STF of the PPDU across the dRU spreading bandwidth on the plurality of tones of the dRU spreading bandwidth includes transmitting the STF using a 4×EHT-LTF sequence.

Aspect 66. The method of any of Aspects 63 to 65, wherein transmitting the STF of the PPDU across the dRU spreading bandwidth includes: rounding a plurality of tones of the dRU spreading bandwidth to a multiple; and transmitting the STF on the rounded plurality of tones of the dRU.

Aspect 67. The method of any of Aspects 63 to 66, wherein the multiple is a multiple of 2.

Aspect 68. The method of any of Aspects 63 to 67, wherein transmitting the STF of the PPDU across the dRU spreading bandwidth using the tone plan and sequence of the EHT-LTF includes transmitting the STF using a 2×EHT-LTF sequence.

Aspect 69. The method of any of Aspects 63 to 68, wherein the multiple is a multiple of 4.

Aspect 70. The method of any of Aspects 63 to 69, wherein transmitting the STF of the PPDU across the dRU spreading bandwidth using the tone plan and sequence of the EHT-LTF includes transmitting the STF using a 1×EHT-LTF sequence.

Aspect 71. The method of any of Aspects 63 to 70, wherein the multiple is a multiple of 8.

Aspect 72. The method of any of Aspects 63 to 71, wherein the STF is transmitted in a 4×symbol duration.

Aspect 73. The method of any of Aspects 63 to 72, further comprising adding a fixed length cyclic prefix to the STF to fix a symbol duration of the STF.

Aspect 74: A apparatus The apparatus includes a memory (for example, implemented in circuitry) and a processor (or multiple processors) coupled to the memory. The processor (or processors) is configured to: receive a dRU assignment for transmission of a PPDU; and transmit an STF of the PPDU across a dRU spreading bandwidth using a tone plan and sequence of an EHT-LTF.

Aspect 75: The apparatus of Aspect 74, wherein transmitting the STF of the PPDU across the dRU spreading bandwidth includes transmitting the STF directly on a plurality of tones of the dRU spreading bandwidth.

Aspect 76: The apparatus of any of Aspects 74 to 75, wherein the processor is configured to: transmit the STF of the PPDU across the dRU spreading bandwidth on the plurality of tones of the dRU spreading bandwidth includes transmitting the STF using a 4×EHT-LTF sequence.

Aspect 77: The apparatus of any of Aspects 74 to 76, wherein the processor is configured to: round a plurality of tones of the dRU spreading bandwidth to a multiple; and transmit the STF on the rounded plurality of tones of the dRU.

Aspect 78: The apparatus of any of Aspects 74 to 77, wherein the multiple is a multiple of 2.

Aspect 79: The apparatus of any of Aspects 74 to 78, wherein transmitting the STF of the PPDU across the dRU spreading bandwidth using the tone plan and sequence of the EHT-LTF includes transmitting the STF using a 2×EHT-LTF sequence.

Aspect 80: The apparatus of any of Aspects 74 to 79, wherein the multiple is a multiple of 4.

Aspect 81: The apparatus of any of Aspects 74 to 80, wherein transmitting the STF of the PPDU across the dRU spreading bandwidth using the tone plan and sequence of the EHT-LTF includes transmitting the STF using a 1×EHT-LTF sequence.

Aspect 82: The apparatus of any of Aspects 74 to 81, wherein the multiple is a multiple of 8.

Aspect 83: The apparatus of any of Aspects 74 to 82, wherein the STF is transmitted in a 4×symbol duration.

Aspect 84: The apparatus of any of Aspects 74 to 83, wherein the processor is configured to: add a fixed length cyclic prefix to the STF to fix a symbol duration of the STF.

What is claimed is:

1. A method of wireless communication by a wireless station, comprising:
    receiving, from a wireless access point, a distributed resource unit (dRU) assignment for uplink transmission of a first dRU of a physical layer protocol data unit (PPDU) that includes a set of dRUs including the first dRU in accordance with a dRU transmission mode, each dRU of the set of dRUs including a respective set of tones distributed throughout a same spreading bandwidth of a wireless channel over which the PPDU is to be transmitted; and
    transmitting, to the wireless access point, the first dRU along with a short training field (STF) over the spreading bandwidth, the STF being transmitted over a second set of tones in accordance with a tone plan associated with a regular resource unit (rRU) associated with an rRU transmission mode, a set of symbols of the STF being transmitted over the second set of tones in accordance with a symbol sequence associated with the rRU and in accordance with a cyclic shift delay (CSD) associated with a first global CSD index associated with the first dRU that is different than one or more other global CSD indexes associated with one or more other dRUs of the set of dRUs of the PPDU.

2. The method of claim 1, wherein the PPDU includes a long training field (LTF) and a data field, and further comprising setting a transmission power for the STF based on a transmission power associated with the LTF and the data field of the PPDU.

3. The method of claim 2, further comprising setting the transmission power for the STF to be the same as the transmission power associated with the LTF and the data field of the PPDU.

4. The method of claim 1, further comprising:
    obtaining a dRU assignment index allocated to the wireless station based on the dRU assignment; and
    determining, based on the dRU assignment index and the first global CSD index, a CSD start index for the wireless station;
    wherein the STF is transmitted across the spreading bandwidth based on the CSD start index.

5. The method of claim 4, wherein the CSD start index is based on the dRU assignment index and a maximum number of supported spatial streams associated with a CSD table corresponding to the first global CSD index.

6. The method of claim 1, further comprising:
    determining, based on an association identifier (AID) associated with the wireless station and the first global CSD index, a CSD start index for the wireless station;
    wherein the STF is transmitted across the spreading bandwidth based on the CSD start index.

7. The method of claim 6, wherein the CSD start index is based on the AID and a maximum number of supported spatial streams associated with a CSD table corresponding to the first global CSD index.

8. The method of claim 1, further comprising:
    determining, based on a first tone index of the dRU assignment and the first global CSD index, a CSD start index for the wireless station;
    wherein the STF is transmitted across the spreading bandwidth based on the CSD start index.

9. The method of claim 8, wherein the CSD start index is based on the first tone index and a maximum number of supported spatial streams associated with a CSD table corresponding to the first global CSD index.

10. The method of claim 1, further comprising:
    determining, based on a start tone offset associated with a dRU tone table corresponding to the dRU assignment and the first global CSD index, a CSD start index for the wireless station;
    wherein the STF is transmitted across the spreading bandwidth based on the CSD start index.

11. The method of claim 10, wherein the CSD start index is based on the start tone offset and a maximum number of supported spatial streams associated with a CSD table corresponding to the first global CSD index.

12. The method of claim 1, further comprising:
    determining a CSD start index for the wireless station as a random number between 1 and a maximum number of supported spatial streams associated with a CSD table corresponding to the first global CSD index;

wherein the STF is transmitted across the spreading bandwidth based on the CSD start index.

13. The method of claim 1, wherein the first global CSD index is assigned to one or more other wireless station connected to a same AP, and wherein a different CSD start index is assigned to each wireless station connected to the same AP.

14. The method of claim 1, wherein transmitting the STF across the spreading bandwidth using the tone plan and sequence corresponding to the rRU transmission mode includes transmitting the STF every 8 tones of the spreading bandwidth.

15. The method of claim 1, wherein the PPDU includes a dRU and an rRU, and further comprising:
  transmitting the rRU of the PPDU based on a localized CSD index.

16. A wireless station, comprising:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to:
    receive, from a wireless access point, a distributed resource unit (dRU) assignment for uplink transmission of a first dRU of a physical layer protocol data unit (PPDU) that includes a set of dRUs including the first dRU in accordance with a dRU transmission mode, each dRU of the set of dRUs including a respective set of tones distributed throughout a same spreading bandwidth of a wireless channel over which the PPDU is to be transmitted; and
    transmit, to the wireless access point, the first dRU along with a short training field (STF) over the spreading bandwidth, the STF being transmitted over a second set of tones in accordance with a tone plan associated with a regular resource unit (rRU) associated with an rRU transmission mode, a set of symbols of the STF being transmitted over the second set of tones in accordance with a symbol sequence associated with the rRU and in accordance with a cyclic shift delay (CSD) associated with a first global CSD index associated with the first dRU that is different than one or more other global CSD indexes associated with one or more other dRUs of the set of dRUs of the PPDU.

17. The wireless station of claim 16, wherein the PPDU includes a long training field (LTF) and a data field, and wherein the processor-readable code that, when executed by the at least one processor in conjunction with the at least one modem, is configured to set a transmission power for the STF based on a transmission power associated with the long training field (LTF) and the data field of the PPDU.

18. The wireless station of claim 17, wherein the processor-readable code that, when executed by the at least one processor in conjunction with the at least one modem, is configured to set the transmission power for the STF to be the same as the transmission power associated with the LTF and the data field of the PPDU.

19. The wireless station of claim 16, wherein the processor-readable code that, when executed by the at least one processor in conjunction with the at least one modem, is configured to:
  obtain a dRU assignment index allocated to the wireless station based on the dRU assignment;
  determine, based on the dRU assignment index and the first global CSD index, a CSD start index for the wireless station; and
  transmit the STF across the spreading bandwidth based on the CSD start index.

20. The wireless station of claim 19, wherein the processor-readable code that, when executed by the at least one processor in conjunction with the at least one modem, is configured to determine the CSD start index based on the dRU assignment index and a maximum number of supported spatial streams associated with a CSD table corresponding to the first global CSD index.

21. The wireless station of claim 16, wherein the processor-readable code that, when executed by the at least one processor in conjunction with the at least one modem, is configured to:
  determine, based on an association identifier (AID) associated with the wireless station and the first global CSD index, a CSD start index for the wireless station; and
  transmit the STF across the spreading bandwidth based on the CSD start index.

22. The wireless station of claim 21, wherein the processor-readable code that, when executed by the at least one processor in conjunction with the at least one modem, is configured to determine the CSD start index based on the AID and a maximum number of supported spatial streams associated with a CSD table corresponding to the first global CSD index.

23. The wireless station of claim 16, wherein the processor-readable code that, when executed by the at least one processor in conjunction with the at least one modem, is configured to:
  determine, based on a first tone index of the dRU assignment and the first global CSD index, a CSD start index for the wireless station; and
  transmit the STF across the spreading bandwidth based on the CSD start index.

24. The wireless station of claim 23, wherein the processor-readable code that, when executed by the at least one processor in conjunction with the at least one modem, is configured to determine the CSD start index based on the first tone index and a maximum number of supported spatial streams associated with a CSD table corresponding to the first global CSD index.

25. The wireless station of claim 16, wherein the processor-readable code that, when executed by the at least one processor in conjunction with the at least one modem, is configured to:
  determine, based on a start tone offset associated with a dRU tone table corresponding to the dRU assignment and the first global CSD index, a CSD start index for the wireless station; and
  transmit the STF across the spreading bandwidth based on the CSD start index.

26. The wireless station of claim 25, wherein the processor-readable code that, when executed by the at least one processor in conjunction with the at least one modem, is configured to determine the CSD start index based on the start tone offset and a maximum number of supported spatial streams associated with a CSD table corresponding to the first global CSD index.

27. The wireless station of claim 16, wherein the processor-readable code that, when executed by the at least one processor in conjunction with the at least one modem, is configured to:
  determine a CSD start index for the wireless station as a random number between 1 and a maximum number of supported spatial streams associated with a CSD table corresponding to the first global CSD index; and transmit the STF across the spreading bandwidth based on the CSD start index.

28. The wireless station of claim 16, wherein the first global CSD index is assigned to one or more other wireless station connected to a same AP, and wherein a different CSD start index is assigned to each wireless station connected to the same AP.

29. The wireless station of claim 16, wherein, to transmit the STF across the spreading bandwidth using the tone plan and sequence corresponding to the rRU transmission mode, wherein the processor-readable code that, when executed by the at least one processor in conjunction with the at least one modem, is configured to transmit the STF every 8 tones of the spreading bandwidth.

30. The wireless station of claim 16, wherein the PPDU includes a dRU and an rRU, and wherein the processor-readable code that, when executed by the at least one processor in conjunction with the at least one modem, is configured to:

transmit the rRU of the PPDU based on a localized CSD index.

\* \* \* \* \*